(12) United States Patent
Sekigawa

(10) Patent No.: US 11,330,139 B2
(45) Date of Patent: May 10, 2022

(54) IMAGE READING APPARATUS AND IMAGE FORMING SYSTEM

(71) Applicant: CANON KABUSHIKI KAISHA, Tokyo (JP)

(72) Inventor: Akito Sekigawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/212,034

(22) Filed: Mar. 25, 2021

(65) Prior Publication Data

US 2021/0314458 A1 Oct. 7, 2021

(30) Foreign Application Priority Data

Apr. 7, 2020 (JP) .............................. JP2020-069413

(51) Int. Cl.
*H04N 1/12* (2006.01)
*H04N 1/00* (2006.01)
*H04N 1/23* (2006.01)

(52) U.S. Cl.
CPC ....... *H04N 1/1215* (2013.01); *H04N 1/00602* (2013.01); *H04N 1/00631* (2013.01); *H04N 1/2307* (2013.01)

(58) Field of Classification Search
USPC ........................................................ 358/400
See application file for complete search history.

(56) References Cited

U.S. PATENT DOCUMENTS

| | | | |
|---|---|---|---|
| 8,087,667 B2 | 1/2012 | Sekigawa | |
| 8,240,664 B2 | 8/2012 | Sekigawa | |
| 8,500,122 B2 | 8/2013 | Kushida et al. | |
| 8,550,461 B2 | 10/2013 | Sekigawa et al. | |
| 9,067,753 B2 | 6/2015 | Tokuma et al. | |
| 9,665,055 B2 | 5/2017 | Sekigawa | |
| 9,738,469 B2 | 8/2017 | Sekigawa | |
| 9,932,195 B2 | 4/2018 | Sekigawa | |
| 10,981,738 B2 | 4/2021 | Sekigawa | |
| 2013/0071167 A1* | 3/2013 | Nakamura | G03G 15/238 399/381 |
| 2014/0030000 A1 | 1/2014 | Gamo et al. | |
| 2016/0269598 A1 | 9/2016 | Hayashi et al. | |
| 2017/0057773 A1* | 3/2017 | Nakano | B65H 31/26 |
| 2018/0115669 A1* | 4/2018 | Ichimaru | H04N 1/00793 |
| 2020/0041946 A1 | 2/2020 | Sekigawa | |
| 2020/0247627 A1 | 8/2020 | Sekigawa et al. | |
| 2020/0391974 A1* | 12/2020 | Enomoto | B65H 45/165 |
| 2021/0087004 A1 | 3/2021 | Koga et al. | |

* cited by examiner

*Primary Examiner* — Negussie Worku
(74) *Attorney, Agent, or Firm* — Venable LLP

(57) ABSTRACT

An image reading apparatus includes a first roller pair forming a first nip portion, a second roller pair forming second nip portions, an image information reading unit, and a sheet detecting unit. The second roller pair includes a recessed portion formed between the second nip portions of the second roller pair with respect to a rotational axis direction. The sheet detecting unit is provided so that at least a part thereof enters the recessed portion. The first roller pair forms the first nip portion so as to nip a sheet in a region overlapping with the recessed portion with respect to the rotational axis direction and to deliver the sheet, nipped in the first nip portion, to the second nip portions.

16 Claims, 15 Drawing Sheets

(a)

SHEET LIBRARY EDIT

| SHEET NAME | WD (mm) | LG (mm) | B.W. (g/m²) | SUFC PROP | COLOR |
|---|---|---|---|---|---|
| ABC RCYCL 1 | 210 | 297 | 75 | P.P. | WHT |
| ABC RCYCL 2 | 297 | 420 | 75 | P.P. | WHT |
| DEF EMBSS A-1 | 216 | 279 | 150 | EMBSS | WHT |
| DEF CTD P-1 | 279 | 432 | 128 | D.S.CT | WHT |
| XYZ COLOR 81 | 210 | 297 | 75 | P.P. | ORN |
| XYZ COLOR 82 | 210 | 297 | 75 | P.P. | PNK |

[ ADD ]  [ EDIT ]  [ DELETE ]  [ ADJUST ]

(b)

<PRNT PSTN AJSTMNT:CRRCTN MTD SLCTN>

[ MANUALLY ADJUST ]

[ READ PAGE AND ADJUST ]

Fig. 5

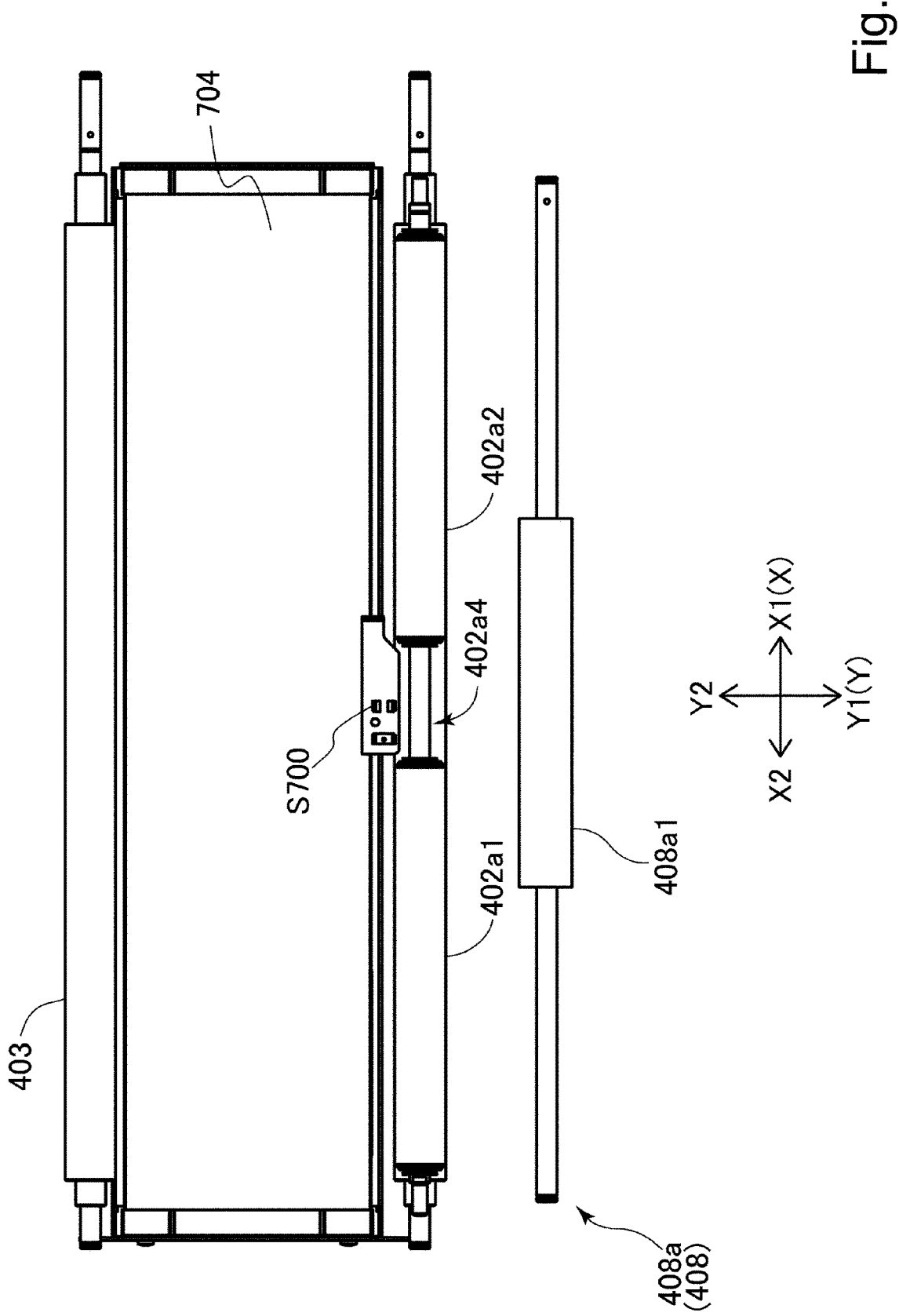

IMAGE READING APPARATUS AND IMAGE FORMING SYSTEM

FIELD OF THE INVENTION AND RELATED ART

The present invention relates to an image reading apparatus for reading an image on a sheet and relates to an image forming system including the image reading apparatus.

Conventionally, an image forming system including an image forming apparatus for forming an image on a sheet and an image reading apparatus for reading the image, formed on the sheet by the image forming apparatus, by an image scanner has been disclosed (U.S. Patent Application Publication No. US2016/0269598). This image forming system compares image data (image information) read by the image reading apparatus with image data when the image forming apparatus forms the image and thus performs front and back positional adjustment, density adjustment, color (hue) adjustment and the like.

In general, the image reading apparatus for optically reading the image on the sheet reads image information of the sheet while nipping and conveying the sheet by a rotating roller pair or the like. In such an image reading apparatus, for example, in the case where the sheet is nipped and conveyed by the between pair or the like provided with a recessed portion, wherein the sheet cannot be nipped, at a part of the roller pair with respect to a widthwise direction, the sheet is liable to cause creases or flexure at this recessed portion, so that it is difficult to achieve sufficient reading accuracy.

SUMMARY OF THE INVENTION

A principal object of the present invention is to provide an image reading apparatus and an image forming system which are capable of improving reading accuracy of an image.

According to an aspect of the present invention, there is provided an image reading apparatus for reading image information on a sheet discharged from an image forming apparatus for forming an image on the sheet, the image reading apparatus comprising: a first roller pair configured to form a first nip portion in which the sheet is nipped and to convey the sheet at the first nip portion; a second roller pair, provided downstream of the first roller pair in a sheet conveying direction, configured to form second nip portions in which the sheet is nipped and convey the sheet at the second nip portions; a reading unit configured to read the image information on the sheet conveyed by the first roller pair and the second roller pair; and a detecting unit configured to detect the sheet to be conveyed toward the reading unit; wherein the second roller pair includes a recessed portion formed between the second nip portions with respect to a rotational axis direction, wherein the detecting unit is provided so that at least a part thereof enters the recessed portion, and wherein the first roller pair is configured to form the first nip portion so as to nip the sheet in a region overlapping with the recessed portion with respect to the rotational axis direction and to deliver the sheet, nipped in the first nip portion, to the second nip portions.

Further features of the present invention will become apparent from the following description of exemplary embodiments with reference to the attached drawings.

Part (a) of FIG. 5 is a schematic view showing a display screen of a sheet library, and part (b) of FIG. 5 is a schematic view showing a selection screen of a correcting method of a geometric adjusting value.

Figure 6:
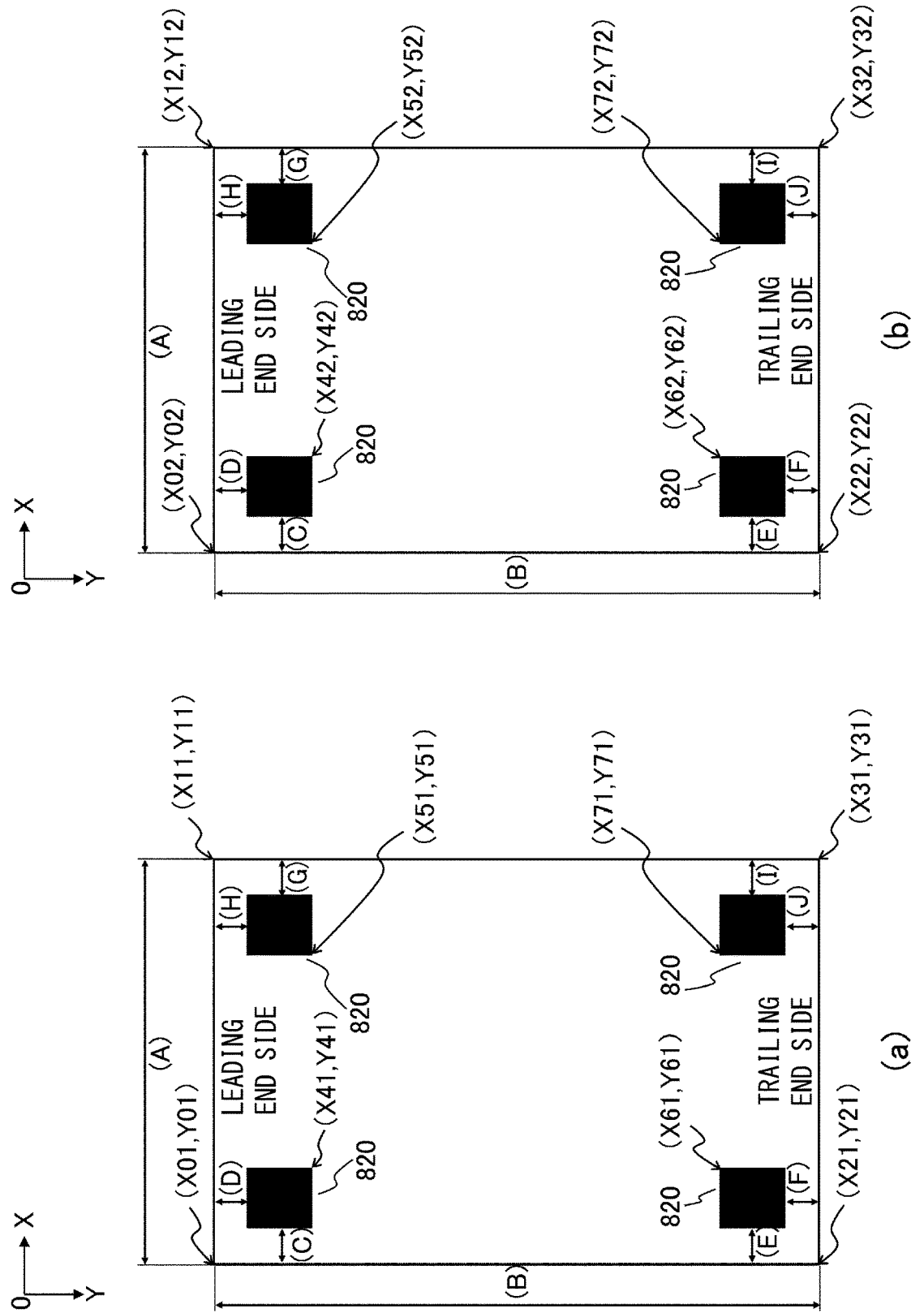

Part (a) of FIG. 6 is a schematic view showing a test pattern for front and back registration formed on a front surface of a sheet, and part (b) of FIG. 6 is a schematic view showing a test pattern for front and back registration formed on a back surface of the sheet.

Figure 7:
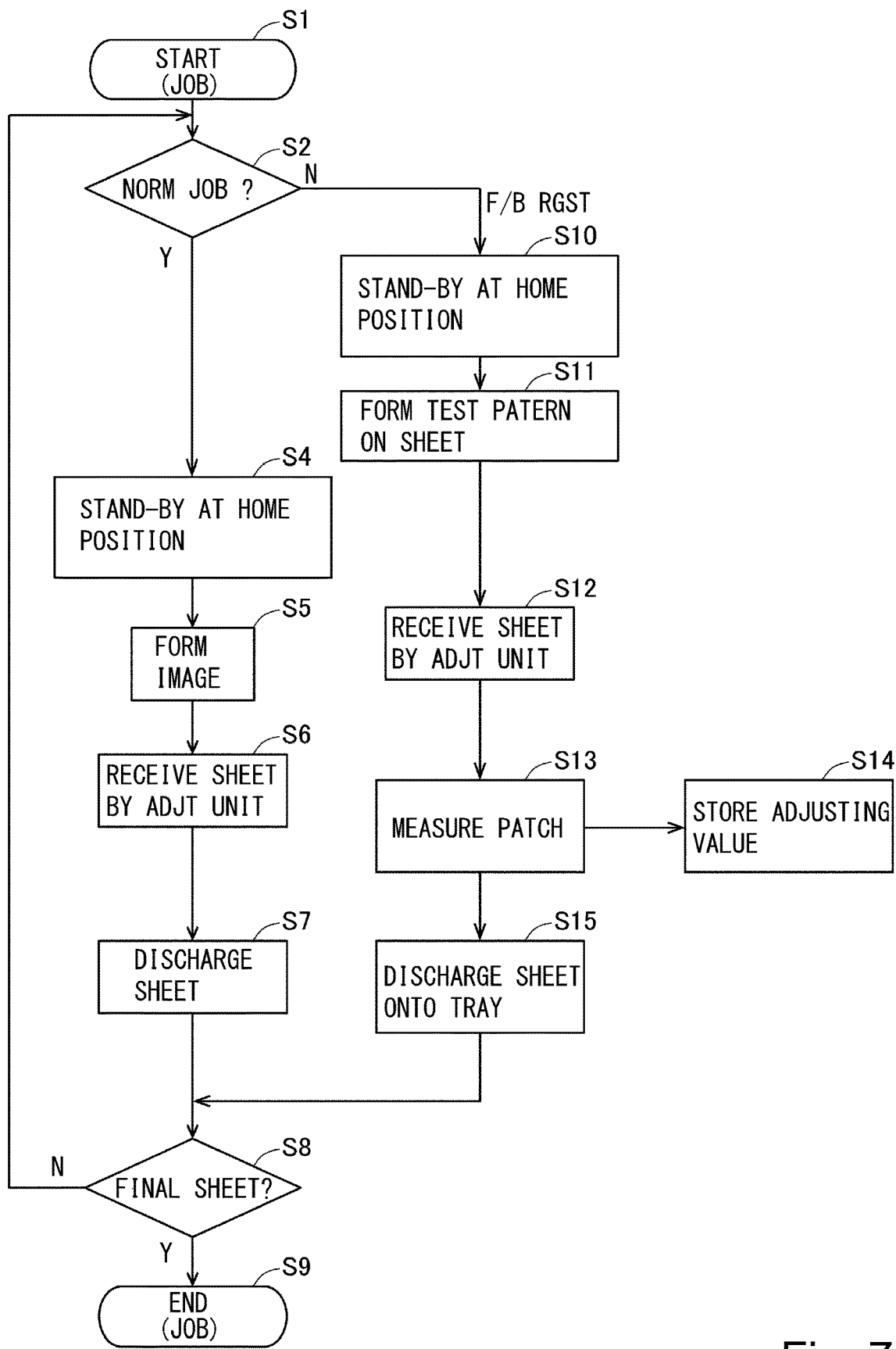

FIG. 7 is a flowchart showing a control example of the image forming system.

Figure 8:
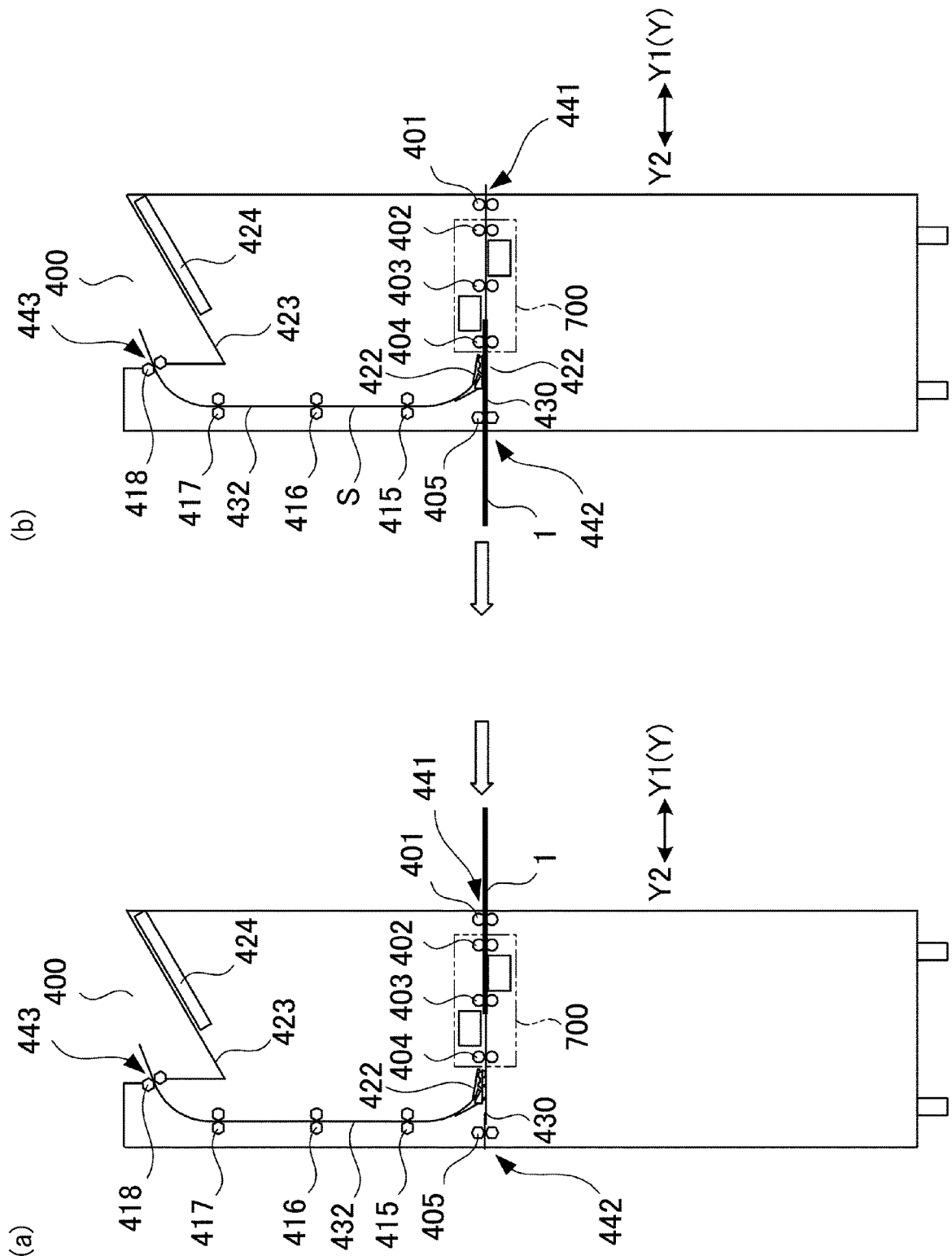

Parts (a) and (b) of FIG. 8 are schematic views for illustrating a sheet conveying operation in a normal job, in which different states are shown, respectively.

Figure 9:
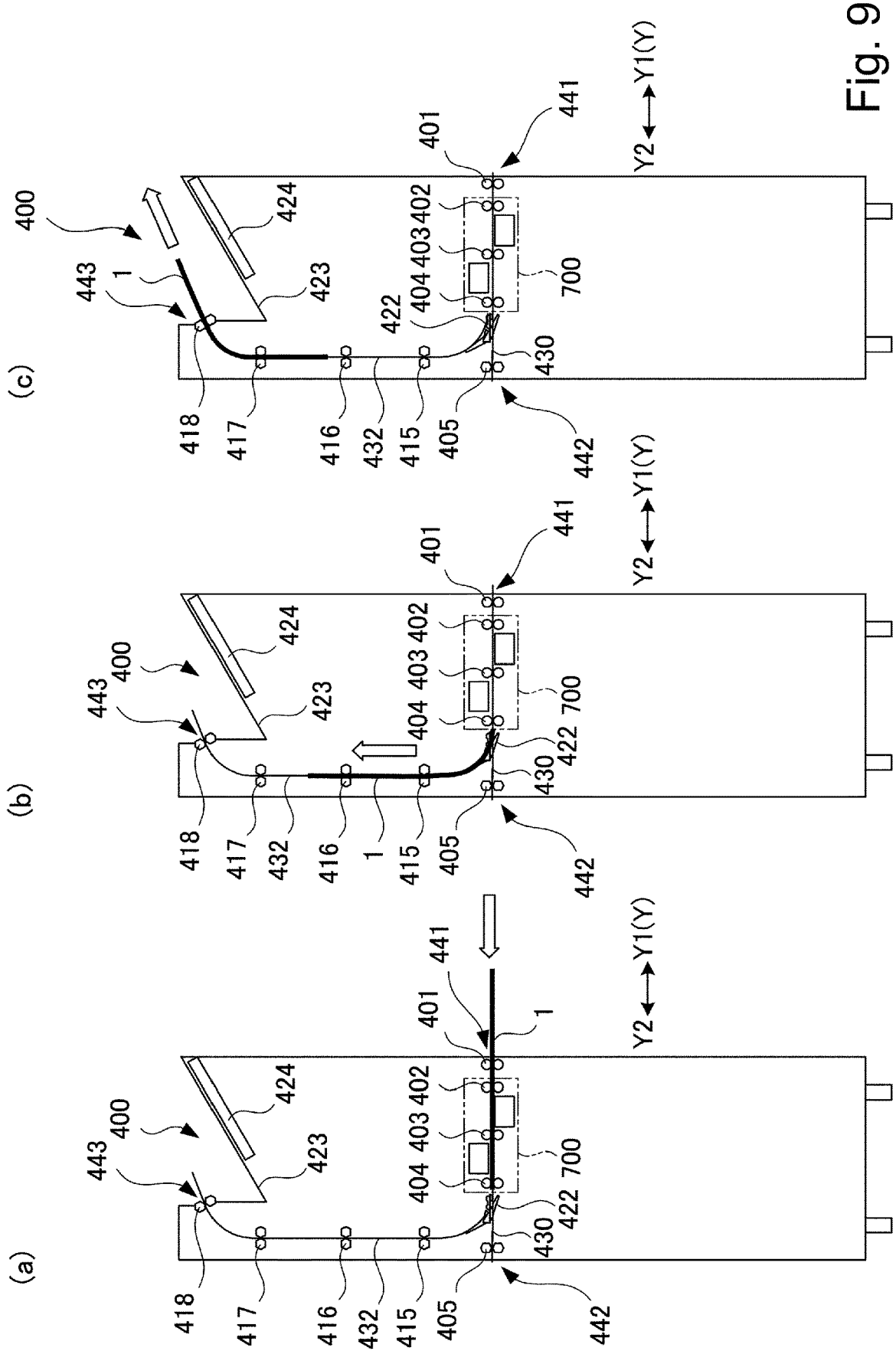

Parts (a) to (c) of FIG. 9 are schematic views for illustrating a sheet conveying operation in a front and back registration job, in which different states are shown, respectively.

Figure 10:
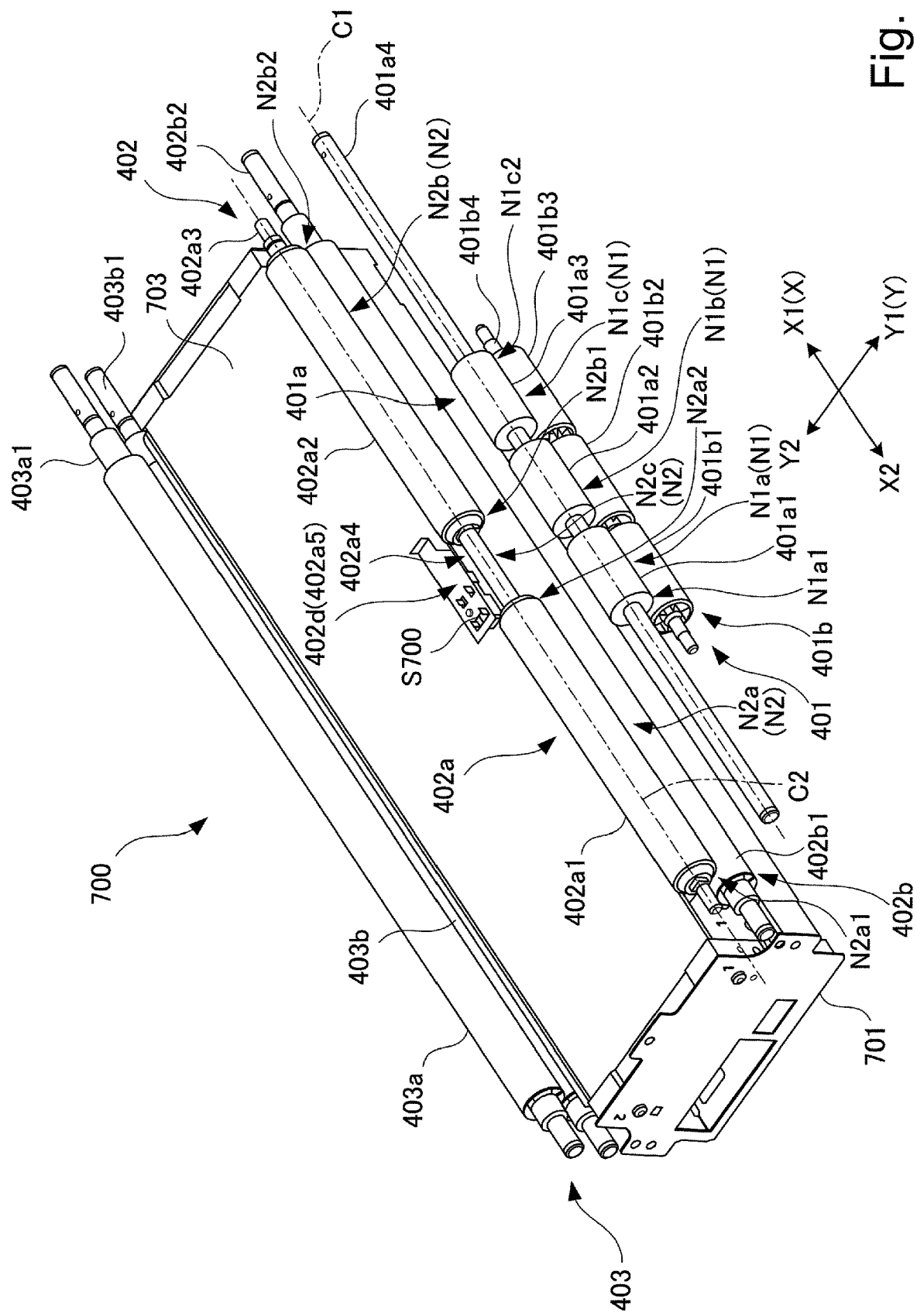

FIG. 10 is a perspective view of the front and back registering portion and an inlet conveying roller pair.

Figure 11:
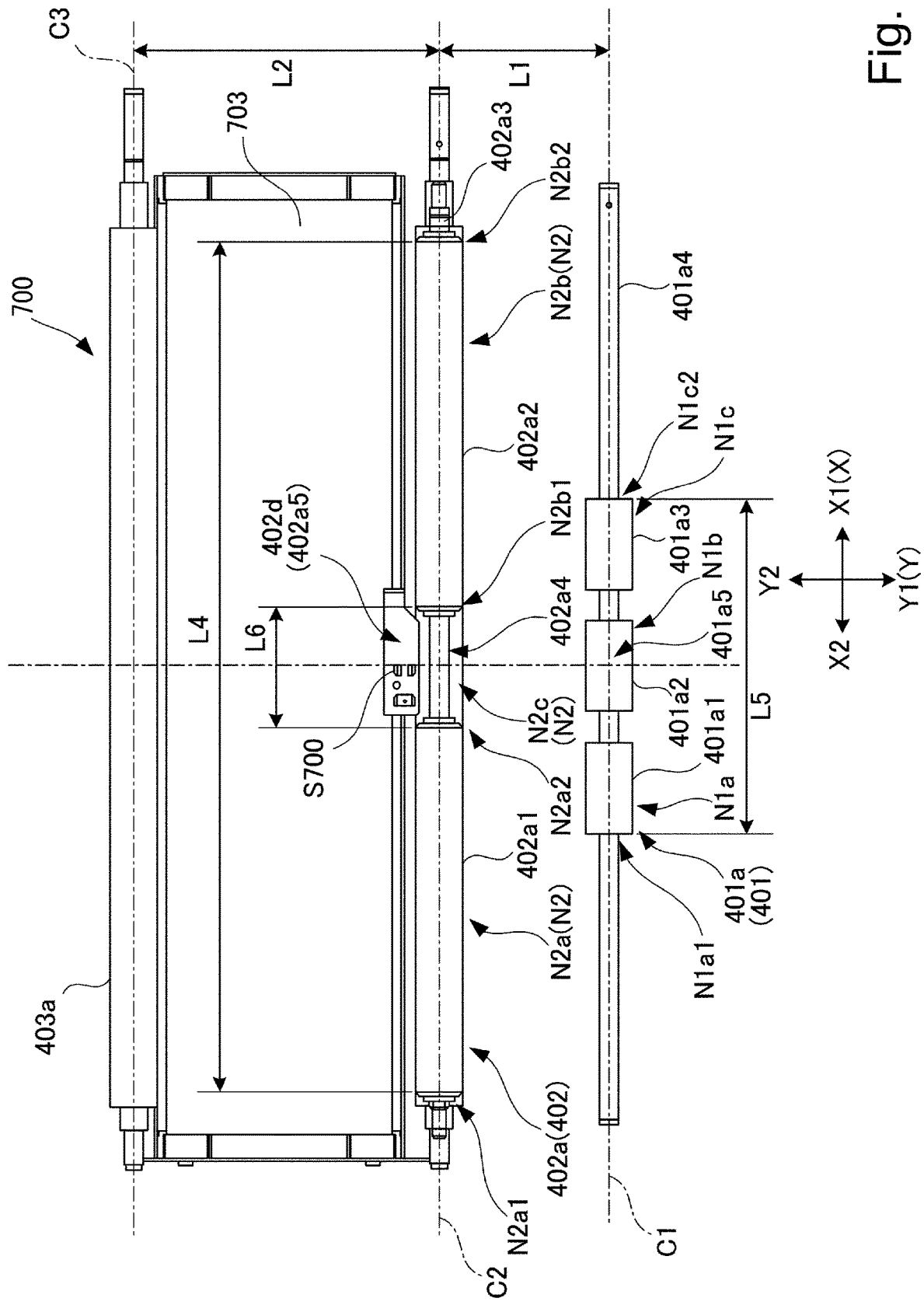

FIG. 11 is a top (plan) view of the front and back registering portion and the inlet conveying roller pair.

Figure 12:
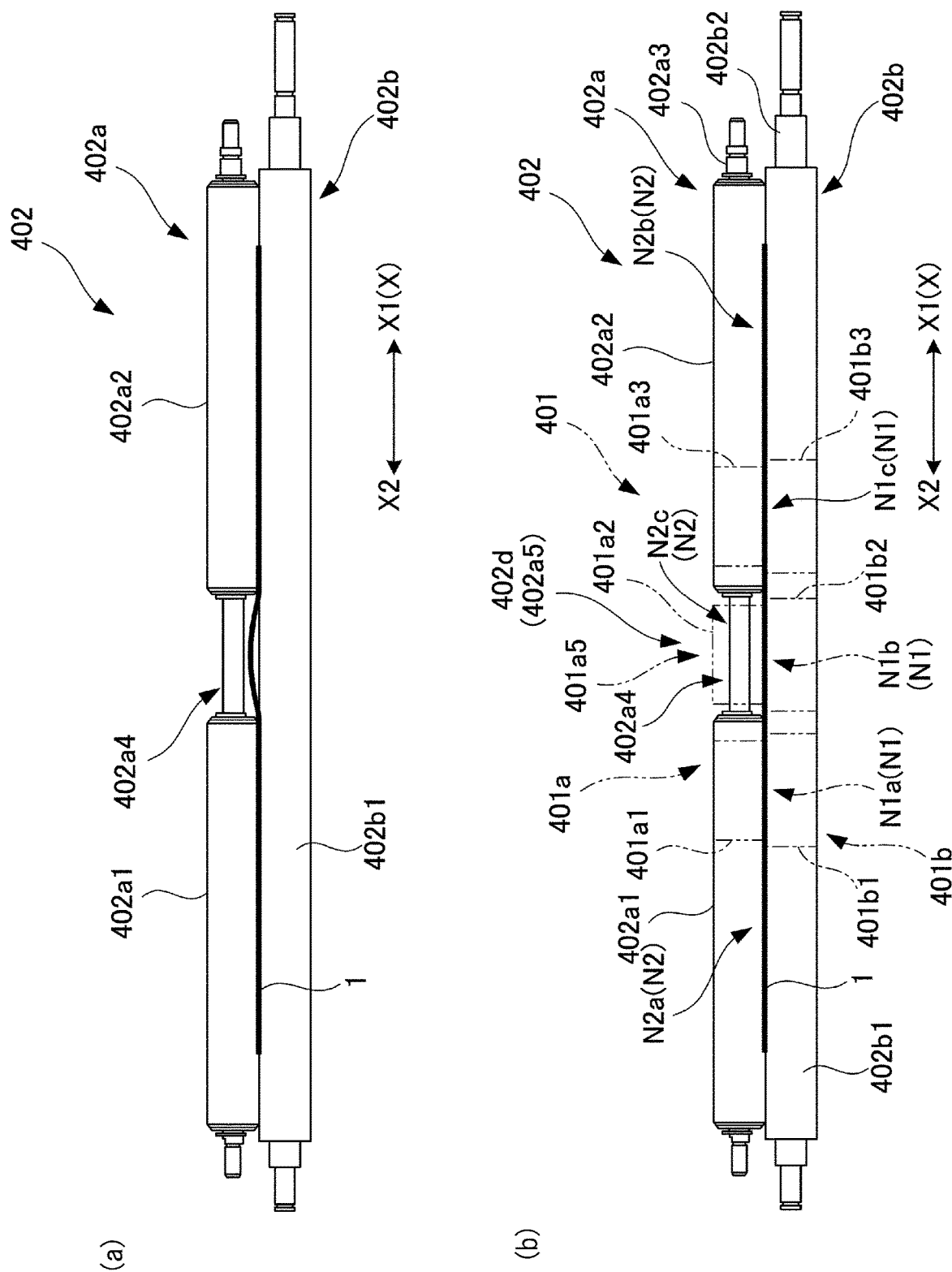

Part (a) of FIG. 12 is a schematic view showing a sheet conveyed by an upstream conveying roller pair in a flexed as viewed in a sheet conveying direction, and part (b) of FIG. 12 is a schematic view showing a sheet conveyed by the upstream conveying roller pair in a flexure-suppressed state as viewed in the sheet conveying direction.

Figure 13:
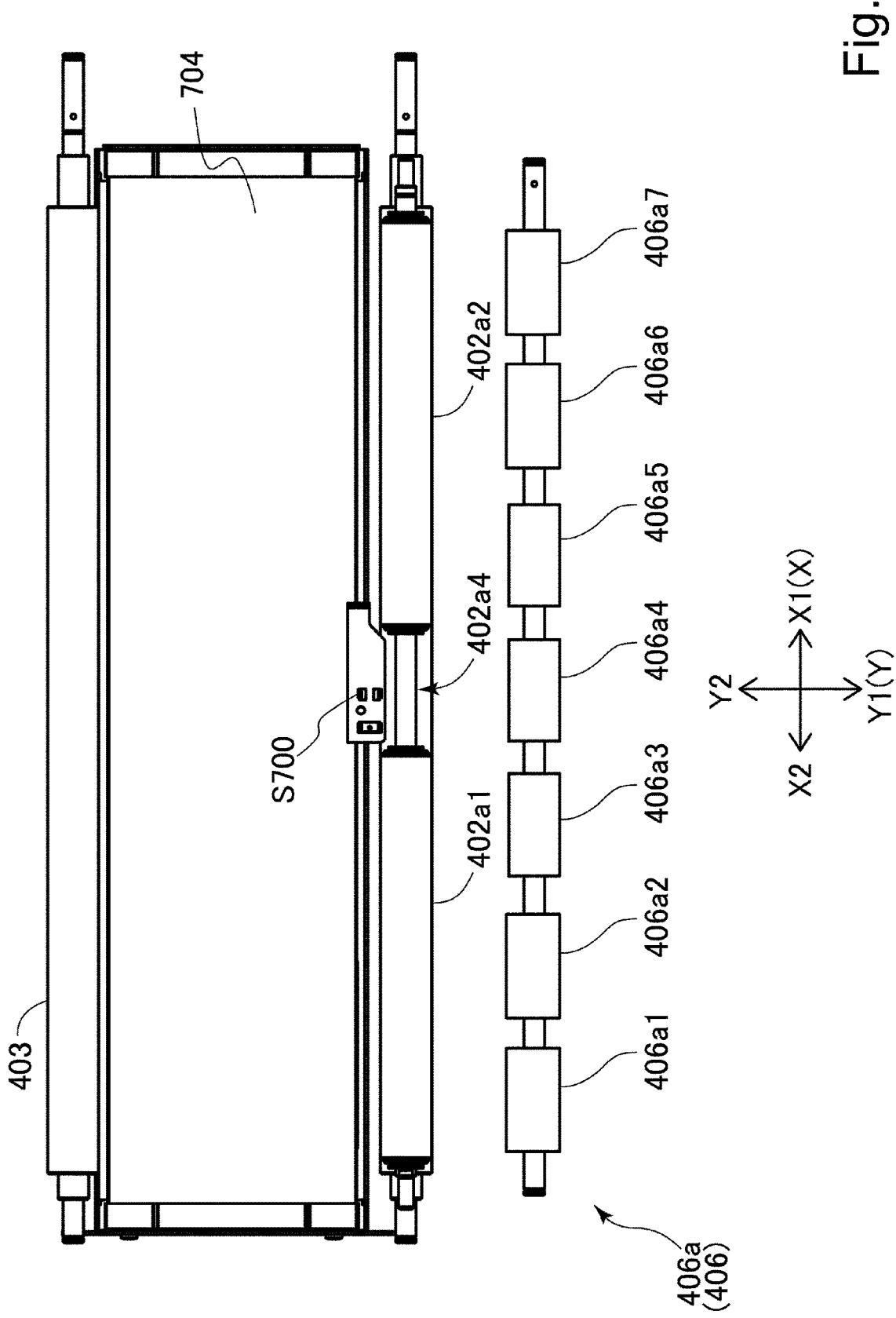

FIG. 13 is a plan view showing a front and back registering portion in a second embodiment.

Figure 14:
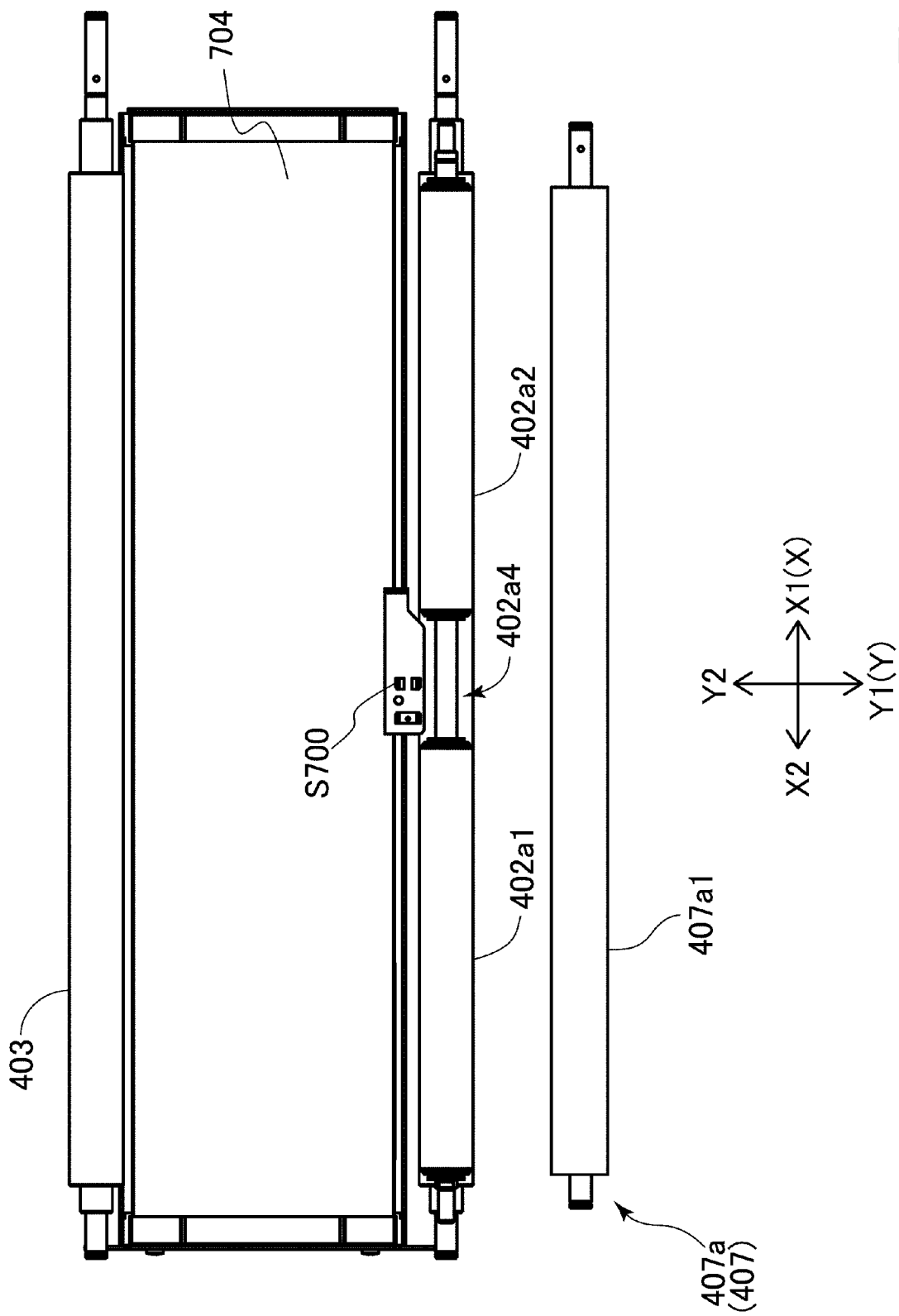

FIG. 14 is a plan view showing a front and back registering portion in a third embodiment.

FIG. 15 is a plan view showing a front and back registering portion in a fourth embodiment.

DESCRIPTION OF THE EMBODIMENTS

In the following, an image reading apparatus and an image forming apparatus according to embodiments will be described while making reference to the drawings. As regards dimensions, materials, shapes, and relative arrangement of constituent elements described in the following embodiments, an applied range of the present invention is not intended to be limited thereto unless otherwise specified.

First Embodiment

[General Structure of Image Forming System]

Figure 1:
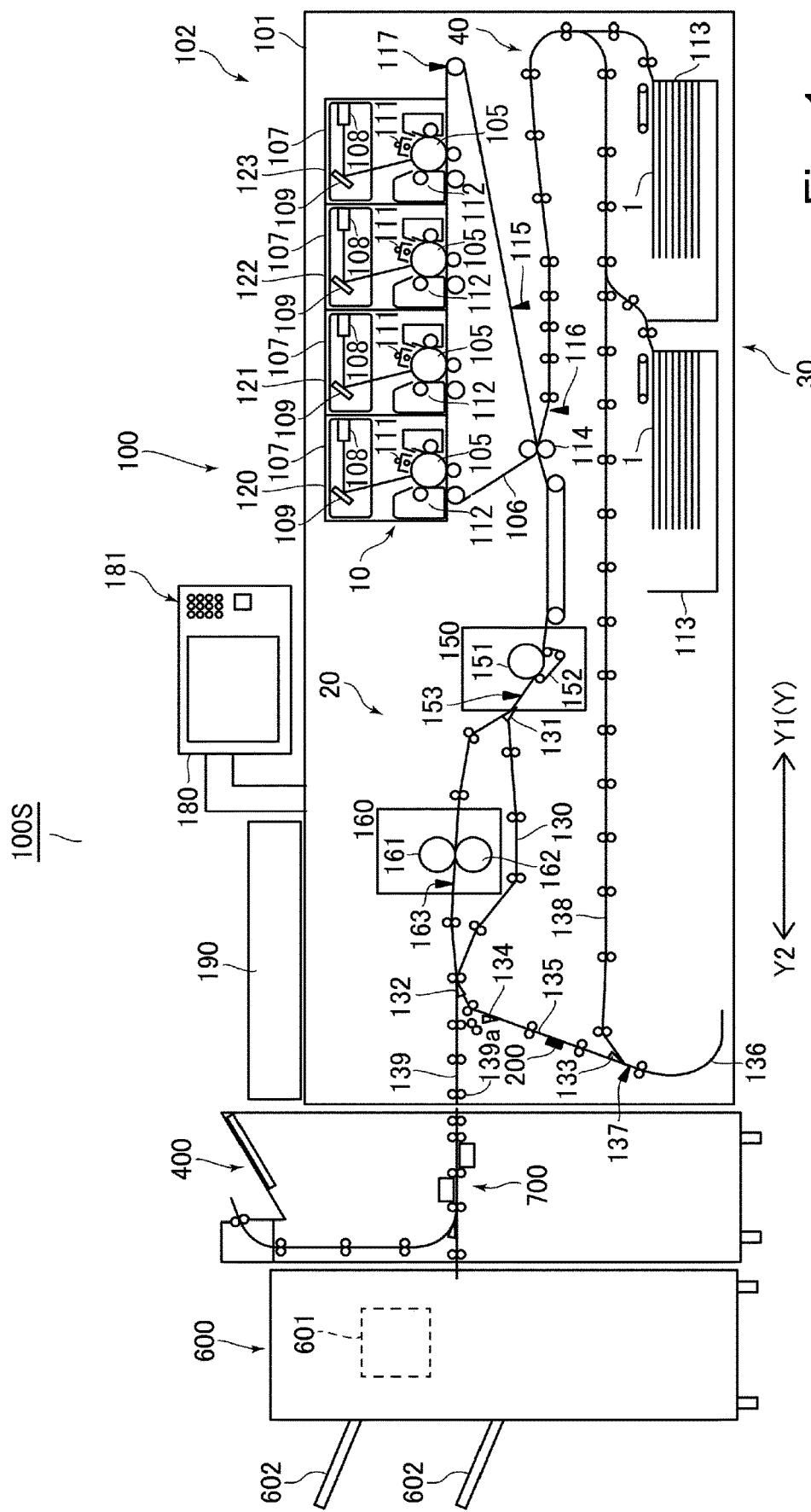
FIG. 1 is a schematic view of an image forming system according to a first embodiment.

FIG. 1 is a schematic view showing an image forming system 100S. The image forming system 100S includes an image forming apparatus 100, an adjusting unit 400 and a finisher 600. In this embodiment, as the image forming apparatus, the image forming apparatus 100 which is a laser beam printer of an electrophotographic type will be described as an example, but the image forming apparatus may also be a printer of an ink jet type or a printer of a sublimation type. The adjusting unit 400 is an example of the image reading apparatus in this embodiment.

In a casing 101 of the image forming apparatus 100, an image forming engine 102 and a control board accommodating portion (not shown) for accommodating a printer controller 103 (FIG. 2) for controlling an operation of the image forming system 100S. The image forming engine 102 which is an example of an image forming portion includes an optical processing mechanism 10 for forming an image on a recording material by an image forming process, a fixing processing mechanism 20, and a conveying processing mechanism 30 and a conveying processing mechanism 40 which are used for conveying and conveying a rectangular sheet 1 used as the recording material, respectively. As the recording material, it is possible to use sheets including papers such as plain paper and thick paper, surface-treated papers such as coated paper and embossed paper, a plastic film, a cloth, and the like.

The optical processing mechanism 10 includes stations 120, 121, 122 and 123 for forming toner images of colors of yellow, magenta, cyan and black and includes an intermediary transfer belt 106. In each of the stations 120 to 123, a surface of a photosensitive drum 105 which is a drum-shaped photosensitive member is electrically charged by a primary charger 111. A laser scanner portion 107 performs an exposure process of the photosensitive drum 105 on the basis of an instruction signal which is formed on the basis of the image data and which is sent to the laser scanner portion 107. The laser scanner portion 107 includes a laser driver for turning on and off an unshown semiconductor laser to emit laser light. The laser scanner portion 107 guides the laser light from the semiconductor laser to the photosensitive drum 105 through a reflection mirror 109 while dividing the laser light into portions by a rotatable polygonal mirror with respect to a main scan direction (widthwise direction of the sheet). By this, on the surface of the photosensitive drum 105, an electrostatic latent image corresponding to the image data is formed.

A developing device 112 accommodates therein a developer containing toner and supplies charged toner particles to the photosensitive drum 105. The toner particles are deposited on the drum surface depending on a surface potential distribution, so that the electrostatic latent image carried on the photosensitive drum 105 is visualized as a toner image. The toner image carried on the photosensitive drum 105 is transferred (primary-transferred) onto the intermediary transfer belt 106 to which a voltage of a polarity opposite to a normal charge polarity of the toner is applied. In the case where a color image is formed, toner images formed by the four stations 120 to 123 are multiple-transferred onto the intermediary transfer belt 106 so as to be superposed on each other, so that a full-color toner image is formed on the intermediary transfer belt 106.

On the other hand, the conveying processing mechanism 30 conveys sheets 1 one by one toward a transfer roller 114 from a sheet accommodating portion 113 inserted into the casing 101 of the image forming apparatus 100 so as to be capable of being pulled out. The toner image carried on the intermediary transfer belt 106 which is an intermediary transfer member is transferred (secondary-transferred) onto the sheet 1 by the transfer roller 114.

Around the intermediary transfer belt 106, an image formation start position detecting sensor 115 for determining a print start position when the image formation is carried out, a conveying timing sensor 116 for timing conveying of the sheet 1, and a density sensor 117 are provided. The density sensor 117 measures a density of a patch image for a test carried on the intermediary transfer belt 106. The printer controller 103 adjusts an operation condition (for example, setting of a target charging potential of the primary charger 111 and a bias voltage of the developing provided 112) of the optical processing mechanism 10 on the basis of a detection result of the density sensor 117.

The fixing processing mechanism 20 is constituted by a first fixing device 150 and a second fixing device 160. The first fixing device 150 includes a fixing roller 151 for applying heat to the sheet 1, a pressing belt 152 for causing the sheet 1 to press-contact the fixing roller 151, and a first post-fixing sensor 153 for detecting completion of a fixing process by the first fixing device 150. The fixing roller 151 is a hollow roller and includes therein a heater. The first fixing device 150 applies heat and pressure to the toner image on the sheet 1 while nipping and conveying the sheet 1 by the fixing roller 151 and the pressing belt 152 which constitute a roller pair. By this, the toner particles are melted and then is sticked, so that an image is fixed on the sheet 1.

The second fixing device 160 is disposed downstream of the first fixing device 150 in a conveying passage of the sheet 1. The second fixing device 160 has a function of enhancing glossiness of the image fixed on the sheet 1 by the first fixing device 150 and of ensuring a fixing property of the image on the sheet 1. Similarly as the first fixing device 150, the second fixing device 160 includes a fixing roller 161 and a pressing roller 162 as a roller pair for heating and pressing the image on the sheet 1 while conveying the sheet 1, and a second post-fixing sensor 163 for detecting completion of a fixing process by the second fixing device 160.

Incidentally, depending on a kind of the sheet 1, there is no need to pass the sheet 1 through the second fixing device 160 in some instances. In such a case, the image forming apparatus 100 includes a circumventing conveying passage 130 for discharging the sheet 1 without via the second fixing device 160 for the purpose of reducing energy consumption. The sheet 1 sent from the first fixing device 150 is derived to either one of the second fixing device 160 and the circumventing conveying passage 130 by a first switching flapper 131.

The sheet 1 passed through the second fixing device 160 or the circumventing conveying passage 130 is derived to either one of discharge conveying passage 139 and a reverse conveying passage 135 by a second switching flapper 132. The sheet 1 conveyed to the reverse conveying passage 135 is then subjected to detection of a position thereof by a reverse sensor 137, so that a downstream end (leading end) and an upstream end (trailing end) of the sheet 1 with respect to a sub-scan direction (sheet conveying direction) are changed to each other by a switch-back operation performed by reversing portion 136. In the case of double-side printing, the sheet 1 on which the image is formed on a front surface thereof is conveyed toward the transfer roller 114 again via a re-conveying passage 138 in a state in which the reading end and the trailing end of the sheet 1 are changed to each other by the reversing portion 136, and then an image is formed on a back surface of the sheet 1 opposite from the front surface of the sheet 1.

The sheet 1 on which image formation of one-side printing is ended or the sheet 1 on which image formation on the back surface of the sheet 1 in the double-side printing is discharged to an outside of the image forming apparatus 100 by a discharging roller 139a (discharging portion) provided in the discharge conveying passage 139. Incidentally, between the reverse conveying passage 135 and the discharge conveying passage 139, a switching flapper 134 capable of guiding the sheet 1, switched back by the reversing portion 136, toward the discharge conveying passage 139 is provided and is constituted so that the front surface and the back surface of the sheet 1 when the sheet 1 is discharged from the image forming apparatus 100 are selectable. Incidentally, at an upper portion of the image forming apparatus 100, an image reading apparatus 190 for reading image information from an original is provided.

Figure 2:
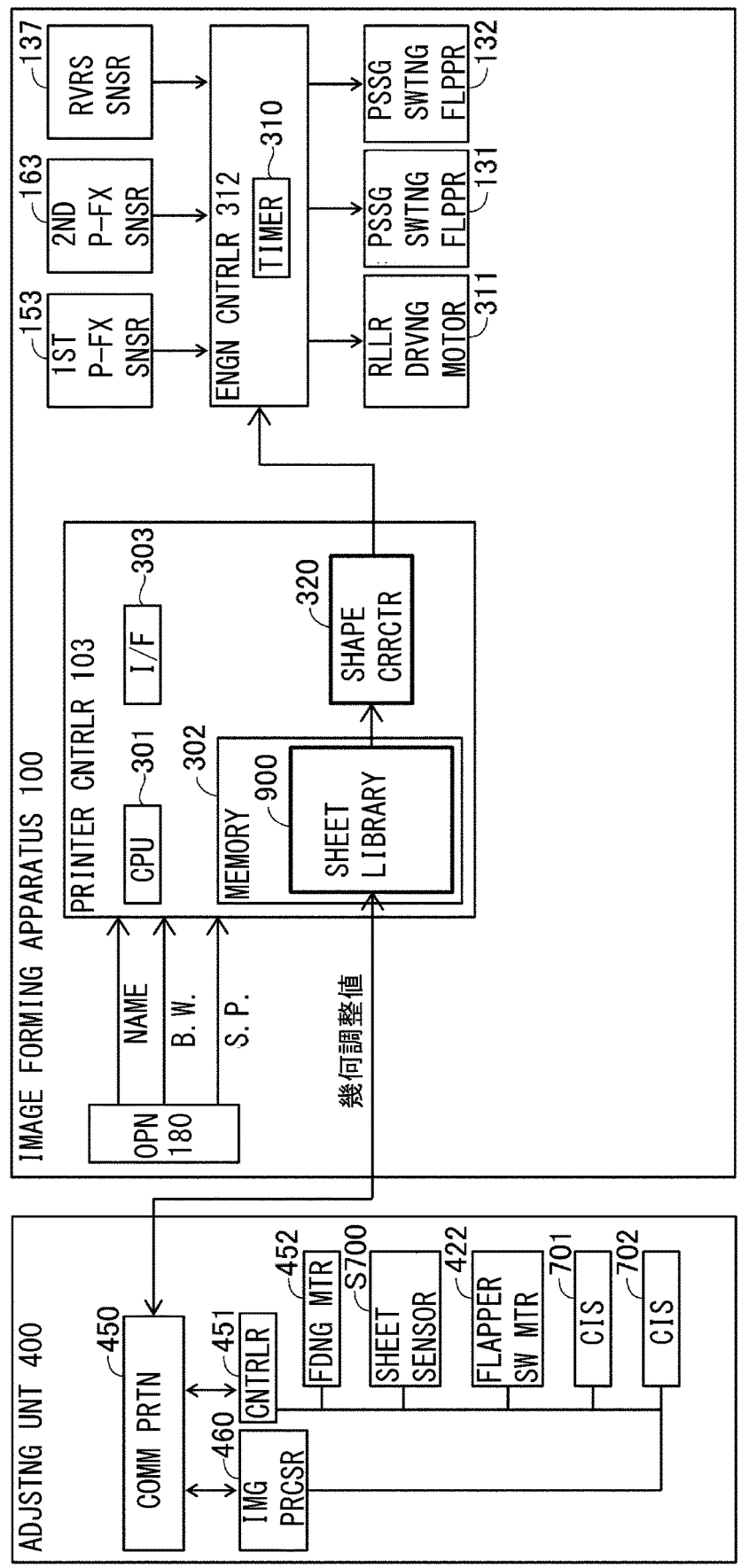
FIG. 2 is a block diagram showing a control constitution of the image forming system.

As shown in FIG. 2, the image forming apparatus 100 includes the printer controller 103 as a control means for carrying out integrated control of the operation of the image forming system 100S (FIG. 1) and an engine controller 312 for controlling the image forming engine 102 (FIG. 1). The printer controller 103 is a control board on which at least one processor (hereinafter referred to as CPU) 301, a memory 302 and an external interface (I/F) 303 are mounted. The memory 302 contains a transient storing medium and a non-transient storing medium, and is not only a storage place of a program and data but also an operating space when the CPU 301 executes the program.

The engine controller 312 causes the image forming engine 102 to perform the above-described image forming process on the basis of an instruction signal or the like from the printer controller 103, so that the image is formed on the sheet 1. For example, the engine controller 312 controls operations of a conveying motor 311 for driving the rollers for conveying the sheet 1 and the first switching flapper 131 and the second switching flapper 132 on the basis of detection signals of the first post-fixing sensor 153, the second post-fixing sensor 163 and the reverse sensor 137.

The image forming apparatus 100 is provided with an operating portion 180 (FIG. 1) which is a user interface of the image forming system 100S. The operating portion 180 includes a display as a display means for displaying information to the user. Further, the operating portion 180 is provided with, for example, physical keys such as numeric keys and a print execution button and the like, and a touch panel function of the display as an input means capable of inputting instructions and data from the user to the image forming system 100S. By the operation of the operating portion 180, the user is capable of inputting, to the printer controller 103, pieces of information indicating sheet attributes such as a name, a basis weight and the presence or absence of surface treatment of the sheet 1 accommodated in the sheet accommodating portion 113 (FIG. 1). The inputted attributes are registered in a sheet library 900 stored in the memory 302.

The printer controller 103 is connected to an external wired or wireless communication network via the external interface (IX) 303 and is communicatable between itself and an external computer (not shown). Further, the printer controller 103 is also connected to control circuits of devices (the adjusting unit 400 and the finisher 600 in this embodiment) which are connected to the image forming apparatus 100 and which constitute the image forming system 100S. The printer controller 103 carries out communication with these devices and causes the image forming apparatus 100 and the respective devices to be cooperated with each other.

[General Structure of Adjusting Unit]

Next, a general structure of the adjusting unit 400 shown in FIG. 1 will be described. The adjusting unit 400 is an example of the image reading apparatus for reading image information of the sheet 1 discharged from the image forming apparatus 100. In general, the image forming apparatus 100 of a print type, such as an electrophotographic type or an ink jet type, in which the image is formed on a cut sheet carries out the image formation on a one-edge basis of a rectangular sheet. For this reason, positional accuracy between a contour of the sheet and an image formed on the sheet and a relative positional accuracy between the image on the front surface of the sheet and the image on the back surface of the sheet, i.e., so-called front and back registration accuracy depends on out accuracy (length, width, perpendicularity and parallelism) of the sheet.

The image forming system S in this embodiment perform adjustment of a relative position between the image on the front surface of the sheet and the image on the front surface of the sheet and the image on the back surface of the sheet (i.e., front and back registration) by adjusting the position of the image relative to a contour (outer configuration) of the sheet and magnification of the image or the like. Specifically, when the image forming system 100S performs the front and back registration, first, by the image forming apparatus 100, a test pattern 820 (part (a) of FIG. 6) is formed on the front surface and the back surface of the sheet. For example, the test pattern 820 includes a plurality of rectangular images (patch images) formed in the neighborhood of an outer edge of the sheet.

Thereafter, the adjusting unit 400 reads the test pattern 820 which is an example of the image information of the sheet and then sends (conveys back) information, based on a read result, to the image forming apparatus 100. The image forming apparatus 100 performs the front and back registration on the basis of the information received from the adjusting unit 400. By performing such front and back registration, the image forming system 100S of this embodiment is capable of improving the front and back registration accuracy even when there is a variation in cutting of the sheet.

The adjusting unit 400 is provided between the image forming apparatus 100 and the finisher 600 with respect to a horizontal direction (left-right direction, Y-direction). That is, an upstream device of the adjusting unit 400 is the image forming apparatus 100, and a downstream device of the adjusting unit 400 is the finisher 600. The finisher 600 includes a processing portion 601 for subjecting the sheet to a marginal cutting process, a binding process, a saddle process and the like process, and discharges the processed sheet or sheet bundle (or the sheet received form the upstream device in the case where there is no need to perform the processes) as a product of the image forming system 100S.

Incidentally, the upstream device and the downstream device of the adjusting unit 400 change depending on a constitution of the image forming system 100S. For example, the adjusting unit 400 is not always directly connected to the image forming apparatus 100, but a constitution in which an intermediary unit is provided between the image forming apparatus 100 and the adjusting unit 400 and in which the adjusting unit 400 receives the sheet from the intermediary unit may also be employed. As an example of the intermediary unit, it is possible to cite a device for performing coating such that transparent toner is deposited on an image surface of the image-formed sheet and thus glossiness is imparted to the image, a cooling device for cooling the sheet, and the like device. Further, in some cases, a sheet processing device other than the finisher 600 is connected to the adjusting unit 400 on a side downstream of the adjusting unit 400. As an example of such a sheet processing device, it is possible to cite an inserter for inserting a sheet as a cover into the sheet bundle and a stacker movable by a hard cart in a state in which a large volume of products are accommodated.

Figure 3:
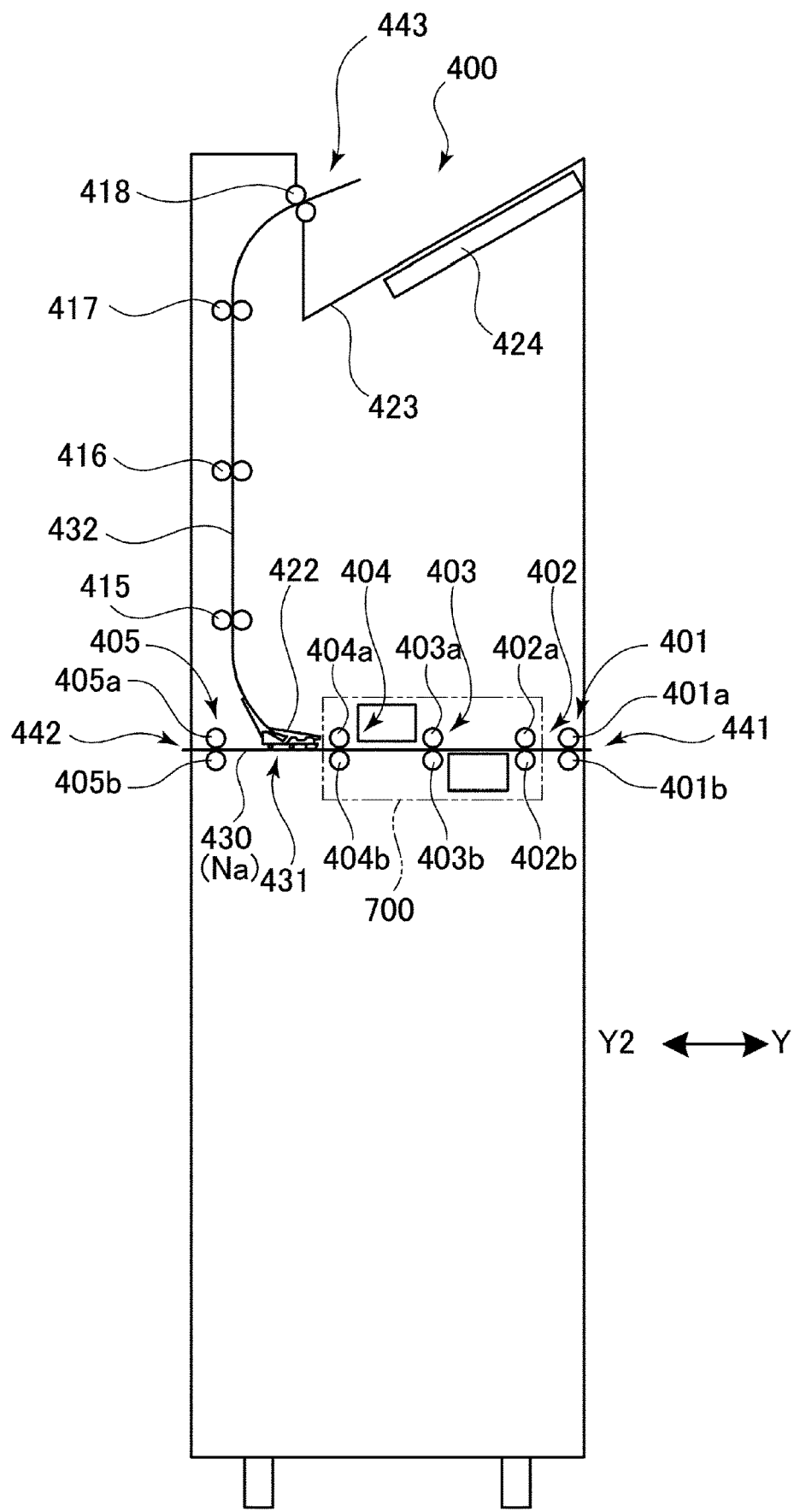
FIG. 3 is a schematic view of an adjusting unit.

As shown in FIG. 3, the adjusting unit 400 is provided with a receiving opening 441 for permitting reception of the sheet, discharged from the image forming apparatus 100, into the adjusting unit 400 and a first discharging opening 442 for permitting discharge of the sheet toward the finisher 600 (FIG. 1). Further, the adjusting unit 400 includes a through passage 430 formed so as to linearly connect the receiving opening 441 and the first discharging opening 442 along the substantially horizontal direction (Y-direction), and includes a discharging passage 432 branching upward from an intermediary portion of the through passage 430 and formed upward. Further, the adjusting unit 400 is provided with a second discharging opening 443 permitting discharge of the sheet, received through the receiving opening 441, to the outside of the adjusting unit 400 through the discharging passage 432, and a discharge tray 423 which is provided atom upper portion of the adjusting unit 400 and on which sheets discharged through the second discharging opening 443 are stacked. The through passage 430 is a first sheet conveying passage in this embodiment, the discharging passage 432 is a second in this embodiment, and the discharge tray 423 is a sheet stacking unit in this embodiment.

On the through passage 430, an inlet conveying roller pair 401 which is provided so as to face the receiving opening 441 and which is used for conveying the sheet, received through the receiving opening 441, toward the inside the adjusting unit 401 is disposed. Further, on the through passage 430, an outlet conveying roller pair 405 which is provided so as to face the first discharging opening 442 and which is used for conveying the sheet toward the finisher 600 through the first discharging opening 442 is disposed. Further, on the through passage 430, a front and back registering portion 700 as a reading unit for reading the sheet while conveying the sheet is provided on a side downstream of the inlet conveying roller pair 401 and upstream of the outlet conveying roller pair 405 with respect to a sheet conveying direction Y2 of the sheet conveyed by the inlet conveying roller pair 401.

The inlet conveying roller pair 401 as a first roller pair includes a driving roller 401a and a follower roller 401b which are used as rollers which are disposed opposed to each other and which are rotatable. For example, the inlet conveying roller pair 401 is constituted by the driving roller 401a which is one roller (rotatable member) of the first roller pair and the follower roller 401b which is the other roller (rotatable member) of the first roller pair. The driving roller 401a is driven by a conveying motor 452 (FIG. 2) as a driving means and is supported so as to be rotated about a rotational axis C1 (FIG. 10) disposed along a main scan direction (X-direction). Incidentally, in this embodiment, the main scan direction is the substantially horizontal direction. The driving roller 401a is disposed on an upper side of the through passage 430 with respect to a thickness direction (up-down direction shown in FIG. 3) of the sheet.

The follower roller 401b is supported rotatably about a rotational axis parallel to the rotational axis C1 of the driving roller 401a and is disposed on a lower side of the through passage 430 with respect to the thickness direction of the sheet. Between the driving roller 401a and the follower roller 401b, an inlet nip portion N1 as a first nip portion for nipping the sheet is formed.

The inlet conveying roller pair 401 conveys the sheet, conveyed from the image forming apparatus 100, toward the front and back registering portion 700 in the conveying direction Y2 along the through passage 430 while nipping the sheet in the inlet nip portion N1 by the rotating driving roller 401a and the rotating follower roller 401b. Incidentally, the conveying direction Y2 as a sheet conveying direction is the direction (sub-scan direction) toward a left side along the through passage 430 and is perpendicular to the main scan direction (the direction of the rotational axis C1). At this time, the inlet conveying roller pair 401 absorbs a difference in sheet conveying speed between the image forming apparatus 100 and the adjusting unit 400 and enables conveying of the sheet at a conveying speed suitable for reading of the sheet by the front and back registering portion 700. By this, the adjusting unit 400 improves reading accuracy when the front and back registering portion 700 reads the sheet.

The outlet conveying roller pair 405 includes a driving roller 405a and a follower roller 405b which are provided opposed to each other and which are rotatable. The driving roller 405a is driven by the conveying motor 452, and between the driving roller 405a and the follower roller 405b, an outlet nip portion N2 for nipping the sheet is formed. The outlet conveying roller pair 405 conveys, toward the finisher 600, the sheet subjected to reading by the front and back registering portion 700 while nipping the sheet in the outlet nip portion N2.

A branch portion 431 between the discharging passage 432 and the through passage 430 is provided with a switching flapper 422 which is a guiding member capable of switching the conveying passage, of the sheet conveyed through an upstream portion of the through passage 430, between a downstream portion of the through passage 430 and the discharging passage 432. Further, along the discharging passage 432, conveying roller pairs 415, 416, 417 and 418 for conveying the sheet are provided at a plurality of positions along a direction in which the sheet is conveyed. These conveying roller pairs 415 and 418 convey the sheet toward the second discharging opening 443 along the discharging passage 432.

Figure 4:
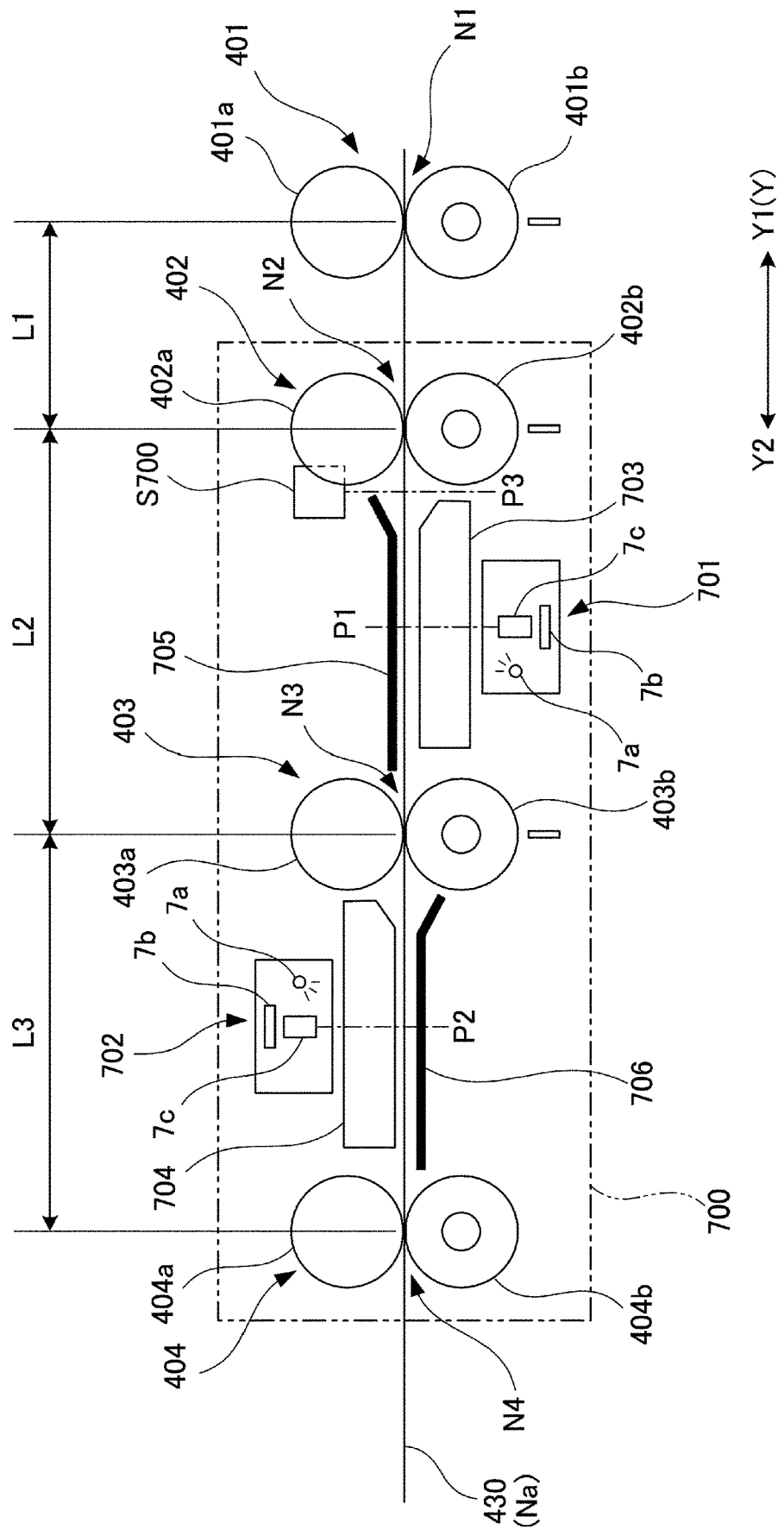
FIG. 4 is a schematic view of a front and back registering portion.

As shown in FIG. 4, the front and back registering portion 700 includes a front surface color image sensor (front surface CIS) 701 and a back surface color image sensor (back surface CIS) 702 provided downstream of the CIS 701 with respect to the conveying direction Y2. The CIS 701 reads a contour of the sheet conveyed along the through passage 430 and the image formed on the sheet from a lower surface (front surface, first surface) of the sheet at a first reading position P1. The first reading position P1 is an optical axis position of an optical system (a lens array 7c in this embodiment) for guiding reflected light from the lower surface of the sheet, to a pick-up element of the CIS 701. Incidentally, in this embodiment, reading of the contour of the sheet and the image formed on the sheet is also referred to as reading of the sheet.

Further, the CIS 702 reads the sheet conveyed along the through passage 430 from an upper surface (back surface, second surface) of the sheet at a second reading position P2. The second reading position P2 is an optical axis position of an optical system (a lens array 7c in this embodiment) for guiding reflected light from the upper surface of the sheet, to a pick-up element of the CIS 702. The CIS 701 is a first reading unit for reading image information on the first surface of the sheet, and the CIS 702 is a second reading unit for reading image information on the second surface of the sheet.

In this embodiment, by using the CIS for reading the sheet, it becomes possible to read the sheet while conveying the sheet without moving the sensor, so that a time required to read the sheet is shortened. Further, by using the image sensor of a 1:1 (non-magnification) optical system, compared with a sensor of a reduction optical system (so-called CCD or the like), it is possible to downsize the image reading apparatus.

The CISs 701 and 702 are disposed at positions different from each other and constitutions thereof are common to each other. Specifically, each of the CISs 701 and 702 includes an LED array 7a as a light source, a sensor array 7b comprising an image pick-up element such as CMOS, and a lens array 7c for forming an image of reflected light, from the conveyed sheet, on the sensor array 7b. The lens array 7c comprises a plurality of lenses which are of a refractive index distribution type and which constitute the 1:1 optical system. The LED array 7a, the sensor array 7b and the lens array 7c are arranged in the main scan direction (widthwise direction of the sheet) over an entire range in which the CISs 701 and 702 are capable of reading image information with respect to the main scan direction.

The front and back registering portion 700 further includes a transparent guide 703 and a black guide 705 which are used for guiding the conveyed sheet at the first reading position P1. The transparent guide 703 is provided below the through passage 430 and above the CIS 701 with respect to the thickness direction (up-down direction shown in FIG. 4) and the black guide 705 is provided above the through passage 430 with respect to the sheet thickness direction.

Further, the front and back registering portion 700 includes a transparent guide 704 and a black guide 706 which are used for guiding the conveyed sheet at the second reading position P2. The transparent guide 704 is provided above the through passage 430 and below the CIS 701 with respect to the sheet thickness direction, and the black guide 706 is provided below the through passage 430 with respect to the sheet thickness direction.

The transparent guides 703 and 704 are formed of a transparent material (glass) through which the reflected light from the sheet passes. The black guides 705 and 706 are background members when the CISs 701 and 702 scans the sheet and are members of a color, for example, black low in brightness so as to give clear contrast with the sheet. Each of the black guides 705 and 706 is disposed opposed to the associated one of the transparent guides 703 and 704 with a predetermined gap through which the sheet is capable of passing.

The transparent guide 703 and the black guide 705 regulate a position of the sheet with respect to a direction of depth of focus (sheet thickness direction) at the reading position P1, and the transparent guide 704 and the black guide 706 regulate a position of the sheet with respect to the direction of depth of focus at the second reading position P2. Incidentally, in place of a constitution in which the transparent guides 703 and 704 are provided separately from the CISs 701 and 702, respectively, each of the transparent guides may also be provided integrally with the CIS, as a part of a casing accommodating the sensor array.

Further, the front and back registering portion 700 includes an upstream conveying roller pair 402, an intermediary conveying roller pair 403 and a downstream conveying roller pair 404 which are used for conveying the sheet in the conveying direction Y2 along the through passage 430. The upstream conveying roller pair 402 as a second roller pair is provided downstream of the inlet conveying roller pair 401 and upstream of the transparent guide 703 and the black guide 705 with respect to the conveying direction Y2. Further, the upstream conveying roller pair 402 is disposed adjacent to the inlet conveying roller pair 401, the transparent guide 703 and the black guide 705.

Incidentally, in this embodiment, the front and back registering portion 700 is constituted so as to be capable of opening the sheet conveying passage in order to facilitate a removing operation of the sheet stagnating in the sheet conveying passage and a cleaning operation of paper dust deposited on the transparent guides 703 and 704. Specifically, the black guides 705 and 706 are constituted so as to be movable in a direction away from the opposing transparent guides 703 and 704, respectively. That is, the black guide 705 is openable upward with respect to the vertical direction, and the black guide 706 is openable downward with respect to the vertical direction.

The upstream conveying roller pair 402 includes a driving roller 402a and a follower roller 402b which are provided opposed to each other and which are rotatable. For example, the upstream conveying roller pair 402 is constituted by the driving roller 402a which is one roller of a pair of rollers and the follower roller 402b which is the other roller of the pair of rollers. The driving roller 402a as a second roller is driven by the conveying motor 452 and is supported so as to be rotatable about a rotational axis C2 (FIG. 10) extending along the main scan direction.

The follower roller 402b as a first roller is supported rotatably about a rotational axis extending along the main scan direction. The driving roller 402a is disposed on the through passage 430 with respect to the sheet thickness direction, and the follower roller 402b is disposed under the through passage 430 with respect to the sheet thickness direction. In other words, as viewed in the main scan direction, the driving roller 402a is disposed on a nip line Na which is a common tangent between the driving roller 402a and the follower roller 402b, and the follower roller 402b is disposed under the nip line Na. Between the driving roller 402a and the follower roller 402b, an upstream nip portion N2 as a second nip portion for nipping the sheet is formed.

A distance L1 between the inlet nip portion N1 of the inlet conveying roller pair 401 and the upstream nip portion N2 of the upstream conveying roller pair 402 with respect to the conveying direction Y2 is smaller than a length, with respect to the sub-scan direction, of a minimum-size sheet conveyable by the adjusting unit 400 and the image forming apparatus 100. For this reason, the inlet conveying roller pair 401 is constituted so as to deliver the sheet to the upstream nip portion N2 of the upstream conveying roller pair 402 in a state in which the sheet is nipped and conveyed in the inlet nip portion N1. Further, a distance L3 (FIG. 11) between one end N2a1 and the other end N2b2 of the upstream nip portion N2 with respect to the main scan direction is larger than a length, with respect to the main scan direction, of a maximum-size sheet (hereinafter, this length is referred to as a maximum sheet width) conveyable by the adjusting unit 400 and the image forming apparatus 100. The upstream conveying roller pair 402 conveys the sheet, conveyed by the inlet conveying roller pair 401, toward the reading position P1.

The intermediary conveying roller pair 403 is provided downstream of the transparent guide 703 and the black guide 705 and upstream of the transparent guide 704 and the black guide 706 with respect to the conveying direction Y2. Further, the intermediary conveying roller pair 403 is disposed adjacent to the transparent guide 703 and the black guide 705 and is also disposed adjacent to the transparent guide 704 and the black guide 706.

The intermediary conveying roller pair 403 includes a driving roller 403a and a follower roller 403b which are provided opposed to each other and which are rotatable. The driving roller 403a is driven by the conveying motor 452 and is supported so as to be rotatable about a rotational axis extending along the main scan direction. The follower roller 403b is supported rotatably about a rotational axis extending along the main scan direction. Between the driving roller 403a and the follower roller 403b, an intermediary nip portion N3 for nipping the sheet is formed.

A distance L2 between the upstream nip portion N2 of the upstream conveying roller pair 402 and the intermediary nip portion N3 of the intermediary conveying roller pair 403 with respect to the conveying direction Y2 is smaller than a length, with respect to the sub-scan direction, of a minimum-size sheet conveyable by the adjusting unit 400 (the image forming apparatus 100). The intermediary conveying roller pair 403 is conveys the sheet toward the reading position P2 while nipping the sheet in the intermediary nip portion N3 and also in the upstream nip portion N2 of the upstream conveying roller pair 402.

The downstream conveying roller pair 404 is provided downstream of the transparent guide 704 and the black guide 706 and upstream of the branch portion 431 between the through passage 430 and the discharging passage 432 with respect to the conveying direction Y2. The conveying roller pair 404 includes a driving roller 404a and a follower roller 404b which are provided opposed to each other and which are rotatable. The driving roller 404a is driven by the conveying motor 452 and is supported so as to be rotatable about a rotational axis extending along the main scan direction. Between the driving roller 404a and the follower roller 404b, a nip portion N4 for nipping the sheet is formed.

With respect to the conveying direction Y2, a distance L3 between the intermediary nip portion N3 of the intermediary conveying roller pair 403 and the downstream nip portion N4 of the downstream conveying roller pair 404 is substantially equal to the distance L2 between the upstream nip portion N2 and the intermediary toner N3. The downstream conveying roller pair 404 conveys the sheet toward the branch portion 431 between the through passage 430 and the discharging passage 432 while nipping the sheet in the downstream nip portion N4 and also in the intermediary nip portion N3 of the intermediary conveying roller pair 403.

The front and back registering portion 700 further includes a sheet conveying sensor S700 as a detecting unit for detecting a downstream and (leading end) of the sheet conveyed by the upstream conveying roller pair 402. The sheet detecting sensor S700 is provided downstream of the upstream nip portion N2 of the upstream conveying roller pair 402 and upstream of the reading position P1 with respect to the conveying direction Y2. The sheet detecting sensor S700 outputs a detection signal when the downstream end of the sheet conveyed by the upstream conveying roller pair 402 reaches a detecting position P3 between the upstream nip portion N2 and the reading position P1. On the basis of output of the detection signal from the sheet detecting sensor S700, sheet reading start timings of the CISs 701 and 702 are determined. Further, this sheet detecting sensor S700 is also used for specifying a jam position of the sheet.

As regards the sheet which reaches the front and back registering portion 700 and which is then conveyed by the upstream conveying roller pair 402, the lower surface of the sheet is scanned and read by the CIS 701 at the first reading position P1 while being conveyed, and then the sheet is further conveyed by the intermediary conveying roller pair 403. The upper surface of the sheet conveyed by the intermediary conveying roller pair 403 is scanned and read by the CIS 702 at the second reading position P2 while being conveyed, and then the sheet is further conveyed by the downstream conveying roller pair 404.

[Reading of Sheet and Convey-Back of Reading Result]

Next, with reference to FIGS. 1, 2 and 5 to 7, reading of the sheet by the front and back registering portion 700 and convey-back of a reading result will be described. The sheet library 900 (FIG. 2) held in the memory 302 by the printer controller 103 includes data in which a list of sheets usable as the recording material is stored by the image forming apparatus 100 in association with attribute information such as lengths in the sub-scan direction and the main scan direction and a basis weight. This sheet library 900 includes geometric adjusting values used when an image forming process is executed for each of the sheets. The geometric adjusting values are parameters for correcting a position of the image relative to the sheet, a magnification of the image, and the like.

As shown in part (a) of FIG. 5, the contents of the sheet library 900 can be checked by displaying a library display screen 1001 on the operating portion 180 (FIG. 1). When a user operates a "print position adjustment" button 1002 on the library display screen 1001, a correcting method selection screen 1003 of the geometric adjusting value shown in part (b) of FIG. 5 is displayed. In the case where the user selects a choice 1004 of "MANUALLY ADJUST", the user is capable of directly designating the geometric adjusting value by inputting numeric values with use of the numeric keys 181 (FIG. 1) provided on the operating portion 180.

On the other hand, in the case where the user selects a choice 1005 of "READ TEST PAGE AND ADJUST", the image forming system 100S (FIG. 1) executes a front and back registration process in which the front and back registration is performed on the basis of the reading result of the sheet. In the front and back registration process, the image forming apparatus 100 forms test patterns 820 (parts (a) and (b) of FIG. 6) for performing the front and back registration of the sheet. Further, in the front and back registration process, the front and back registering portion 700 (FIG. 1) of the adjusting unit 400 reads the sheet conveyed from the image forming apparatus 100 and conveys back a reading result to the image forming apparatus 100. The image forming apparatus 100 performs adjustment (correction) of the geometric adjusting value on the basis of the convey-back from the adjusting unit 400.

Specifically, when the front and back registration process is started, the image forming apparatus 100 in this embodiment conveys the sheet 1 from the sheet accommodating portion 113 accommodating sheets designated as an object to be subjected to the front and back registration process. Thereafter, the image forming apparatus 100 forms, on double surfaces (sides) of the sheet 1, the test patterns 820 (parts (a) and (b) of FIG. 6) including rectangular patch images disposed in the neighborhood of four corners of each of sheet surfaces by the image forming engine 102. After the formation of the test patterns 820, the image forming apparatus 100 discharges the sheet 1 toward the adjusting unit 400. The test patterns 820 are not limited to those constituted by a plurality of the rectangular patch images, but may also be those constituted by a plurality of square patch images. Further, each of the test patterns 820 may also be constituted by a so-called register mark (cross mark) which is a bleeding position mark or a folding position mark or by another shape image or by a combination of these marks or images. Further, a color or a density of the test pattern is not limited to uniform color or density, but the test pattern may also includes patch images with a plurality of colors or a plurality of densities.

When the adjusting unit 400 receives the sheet 1 from the image forming apparatus 100, the adjusting unit 400 reads, as a line image, the front surface and the back surface of the sheet 1 by the CISs 701 and 702 (FIG. 4) while conveying the sheet 1 by the respective conveying roller pairs. Then, an image processing portion 460 (FIG. 2) of the adjusting unit 400 connects the read line images in the sub-scan direction (conveying direction of the sheet 1), so that image data of the front surface and the back surface of the sheet 1 containing the test patterns 820 are combined. Thus, the adjusting unit 400 reads image information of the test patterns 820 when the conveyed sheet 1 is read by the CISs 701 and 702.

The image processing portion 460 of the adjusting unit 400 specifies a contour of the sheet 1, contours of patch images formed on the sheet 1, and a positional relationship of these contours. Specifically, from the combined image data, with respect to the front surface and the back surface of the sheet 1, corner coordinates and coordinates of the patch images of the test patterns 820 are specified. As shown in parts (a) and (b) of FIG. 6, the corner coordinates of the sheet 1 represents four corner positions {(X01, Y01) to (X31, Y31) and (X02, Y02) to (X32, Y32)} of the sheet 1 when an X-axis is the main scan direction and a Y-axis is the sub-scan direction. Further, the coordinates of the test patterns 820 represents specific site positions {(X41, Y41) to (X71, Y71) and (X42, Y42) to (X72, Y72)} of the patch images in the same coordinate system as in the corner coordinate system.

From the corner coordinates, it is possible to geometrically calculate a length (short side length) (A) of the sheet 1 with respect to the main scan direction, a length (long side length) (B) of the sheet 1 with respect to the sub-scan direction, and perpendicularity of each of the corners, and the like, and therefore, it can be said that the corner coordinates include information on the contour (outer configuration) of the sheet 1. Further, from the corner coordinates and the coordinates of the test patterns 820, it is possible to geometrically calculate positional deviation and distortion of the image relative to the contour of the sheet 1, and therefore, it can be said that the corner coordinates and the coordinates of the test patterns 820 include information on positions and distortion of the images relative to the sheet 1.

The image processing portion 460 further determines (calculates) geometric adjusting values for this sheet 1 by using the corner coordinates of the sheet 1 and the coordinates of the test patterns 820. For example, the image processing portion 460 determines a lead position, a side position, main scan magnification and sub-scan magnification as the geometric adjusting values. The lead position is a parameter for defining an image position relative to the sheet 1 with respect to the sub-scan direction. The side position is a parameter for defining the image position relative to the sheet 1 with respect to the main scan direction. The main scanning magnification is a parameter for defining magnification for magnifying or minifying the image data with respect to the main scan direction. Further, the sub-scan magnification is a parameter for defining magnification for magnifying or minifying the image data with respect to the sub-scan direction. The geometric adjusting values are determined so that distances ((c) to (j) in parts (a) and (b) of FIG. 6) from the test patterns 820 to ends (edges) of the sheet 1 are equal to preset values, respectively, in the case where correction of an image shape is made.

Incidentally, the four parameters consisting of the lead position, the sheet position, the main scan magnification and the sub-scan magnification are cited as the geometric adjusting values, but the image processing portion 460 may also calculate other parameters. As other parameters, for example, a parameter for correcting perpendicularity of the image, a parameter for making trapezoidal correction of the image, a parameter for defining an angle of rotation of the image relative to the sheet, and the like parameter would be considered.

The geometric adjusting values determined by the image processing portion 460 are sent to the printer controller 103 of the image forming apparatus 100 through a communicating portion 450 and are registered in the sheet library 900. In the case where the image forming apparatus 100 executes an image forming job, an image shape correcting portion 320 acquires pieces of sheet information 910, 911, 912, . . . (FIG. 5) and geometric adjusting values of the sheet designated as the recording material by making reference to the sheet library 900. Then, the image shape correcting portion 320 corrects image data on the basis of the acquired geometric adjusting values for the sheet. The image data of the front surface and the back surface of the sheet are corrected, so that front and back registration of the sheet is carried out.

Incidentally, in this embodiment, the case where the test patterns 820 for front and back registration are formed on the basis of an explicitly instruction from the user and then the adjusting unit 400 acquires the geometric adjusting values was described, but the present invention is not limited thereto. For example, in the case where the image forming job is inputted, as a preparatory operation before the job is executed, the test patterns 820 are formed on the same sheet as the sheet designated in the job and then the geometric adjusting values may also be acquired. Further, during execution of an image forming job requiring a mass of products, a job for forming the test patterns 820 is automatically interposed every output of a certain number of sheets as the products and then correction (calibration) may also be made. The purpose of reading the sheet by the adjusting unit 400 is not limited to that the geometric adjusting values are acquired and then the positional deviation and distortion of the image relative to the sheet are corrected. For example, in order to monitor that the positional deviation and distortion of the image relative to the sheet fall within predetermined values, the adjusting unit 400 may also read the sheets on which product images are formed and which are continuously conveyed (reading of image information from the sheet).

[Control Method]

In the above-constituted image forming system 100S, a control method when conveying and reading of the sheet are carried out by the adjusting unit 400 will be described while making reference to FIGS. 2, 7 and 8.

In the following description, of the image forming job, a job which requires output of the product and in which the adjusting unit does not perform the reading of the sheet is referred to as a "normal job". Further, of the image forming job, a job in which the adjusting unit 400 performs the reading of the sheet by the CISs 701 and 702 (FIG. 4) is referred to as a "front and back registration nip portion". Incidentally, the ordinary job is inputted to the printer controller 103 in the case where the ordinary job is inputted from an external computer via the external interface (I/F) 303 (FIG. 2) and the case where the user provides an instruction to start a copying operation through the operating portion 180 and in the like case. Further, the front and back registration job can be inputted in the case where the job is executed by the explicit instruction from the user and in the case where the image forming system 100S voluntarily executes the job, as described above.

When the image forming job is started (S1), the printer controller 103 discriminates whether the job is the normal job or the front and back registration job (S2). In the case of the normal job (S2: Y), the image forming apparatus 100 and the adjusting unit 400 cause members (for example, the flapper and the like) relating to the sheet conveying to stand by default positions (home positions). For example, the adjusting unit 400 positions the switching flapper 422 at a position for guiding the sheet to the first discharging opening 442 along the through passage 430 (part (a) of FIG. 8) (S4). That is, as shown in part (a) of FIG. 8, the switching flapper 422 is kept at an upward position.

The image forming apparatus 100 forms the image on the sheet 1 in accordance with the image data required to be outputted by the image forming job (S5), and the adjusting unit 400 receives the sheet 1 on which the image is formed (S6). Then, as shown in parts (a) and (b) of FIG. 8, the adjusting unit 400 delivers the sheet 1 successively by the respective conveying roller pairs and causes the sheet 1 to pass through the through passage 430. Then, the adjusting unit 400 discharges the sheet 1 by the outlet conveying roller pair 405 to the finisher 600 (FIG. 1) through the first discharging opening 442 (S7). When the finisher 600 receives the sheet 1, the finisher 600 subjects the sheet 1 to processing (treatment) by the processing portion 601, so that the processed sheet 1 is stacked as a product on a stacking tray 602.

In the case of the front and back registration job (S3: N), the adjusting unit 400 positions the switching flapper 422 at a position for guiding the sheet 1 to the discharging passage 432 (part (a) of FIG. 9) (S10). That is, as shown in part (a) of FIG. 9, the switching flapper 422 is kept at a downward position.

The image forming apparatus 100 forms the test patterns 820 for the front and back registration (parts (a) and (b) of FIG. 6) on the double surfaces (front and back surfaces) of the sheet 1 (S11), and the adjusting unit 400 receives the sheet 1 on which the test patterns 820 are formed (S12). The adjusting unit 400 causes the CISs 701 and 702 to read the sheet conveyed along the through passage 430 when the sheet 1 is passed through the reading positions P1 and P2 (FIG. 4) of the CISs 701 and 702 (S13, parts (a) and (b) of FIG. 9). Incidentally, before the test patterns 820 on the sheet 1 pass through the reading position P1 of the CIS 701, the controller 451 of the adjusting unit 400 may decelerate a conveying speed of the sheet 1 to a conveying speed suitable for reading of the sheet 1 by the CISs 701 and 702.

The image data read by the CISs 701 and 702 are processed by the image processing portion 460, so that the geometric adjusting values are calculated. The calculated geometric adjusting values are sent to the image forming apparatus 100 via the communicating portion 450 and are stored in the sheet library 900 (S14).

When the sheet 1 passed through the reading positions P1 and P2 reaches the branching portion 431 from the through passage 430 toward the discharging passage 432, the adjusting unit 400 conveys the sheet 1, guided by the switching flapper 422, toward the second discharging opening 443 along the discharging passage 432. The adjusting unit 400 discharges the sheet 1, conveyed along the discharging passage 432, to the discharge tray 423 through the second discharging opening 443 (S15). Thus, the adjusting unit 400 in this embodiment is capable of conveying the sheet 1, on which the image is read by the front and back registering portion 700, to the discharge tray 423, not the finisher 600. By this, for example, during execution of the image forming job requiring the mass of products, even in the case where the sheet for the front and back registration other than the sheet as the product is inserted, the sheet for the front and back registration is prevented from being mixed in the products.

The above-described processes are repetitively executed for each of the sheets in the number of sheets designated in the job, and after the process for a final sheet is ended (S8: Y), the job is ended (S9). Incidentally, in a control example shown in FIG. 7, a kind of the job is discriminated every sheet during processing of the same job, but a constitution in which the kind of the job is discriminated at the time of the start of the job and in which the same process as the process for the last sheet is applied without discriminating the kind of the job during the processing of the job may also be employed. Further, in the control example shown in FIG. 7, the sheet is discharged to the discharge tray 423 after the sheet is read in the job for performing the front and back registration, but the present invention is not limited thereto. The image forming system 100S may also be capable of executing control such that the sheet 1 is discharged to the finisher 600 after the sheet is read in the job for performing the front and back registration. For example, a constitution in which the image forming apparatus 100 forms, on a sheet, an image as a product and test patterns disposed at a marginal portion of the sheet and discharges the sheet to the finisher 600 after the adjusting unit 400 reads the sheet and then the finisher 600 cuts the marginal portion including the test patterns from the sheet may also be employed.

[Details of Front and Back Registering Portion and Inlet Conveying Roller Pair]

Next, details of the front and back registering portion 700 and the inlet conveying roller pair 401 will be described. In general, cutting accuracy of the above-described sheet (sheet cutting accuracy before image formation) is influenced by a material of the sheet, an ambient environment (temperature, humidity) and the like, and therefore, varies depending on a cutting lot of the sheet. In order to obtain a reading result with high accuracy in the image reading apparatus such as the adjusting unit 400, it is desirable that reading of a plurality of sheets is performed every cutting lot of the sheet and then the front and back registration of the sheet is performed on the basis of an averaged reading result.

As a constitution in which operation efficiency of such front and back registration, a constitution in which processes from the image formation to the reading of the sheet are continuously performed as in the image forming system 100S of this embodiment would be considered. However, in order to perform the read of the sheet is conformity to a high sheet conveying speed in the image forming process, it is important to ensure a sufficient light quantity during the reading, and in order to ensure the light quantity, the CIS and the like are liable to upsize, so that it was difficult to realize downsizing of the image reading apparatus.

Further, in general, when the sheet on which the image is formed is conveyed along a conveying passage with large curvature, the sheet causes warpage in same cases, and therefore, the sheet after the image formation may desirably be conveyed along a linear conveying passage. However, in an image reading apparatus capable of reading the sheet conveyed along the linear conveying passage, the respective conveying roller pairs and sensors for reading the sheet have to be disposed along this linear conveying passage, so that it was further difficult to realize the downsizing of the image reading apparatus.

In order to solve such problems, the front and back registering portion 700 in this embodiment realizes the downsizing of the image reading apparatus by suitably arranging the sheet detecting sensor S700 and the upstream conveying roller pair 402. In the following, a specific constitution of the front and back registering portion 700 for realizing the downsizing of the image reading apparatus will be described.

As shown in FIGS. 10 and 11, the driving roller 402a of the upstream conveying roller pair 402 includes a driving shaft 402a3 rotationally driven by the conveying motor 452, and first rotatable portion 402a1 and a second rotatable portion 402a2 which are supported by the driving shaft 402a3. The driving shaft 402a3 is formed along the main scan direction positions the first rotatable portion 402a1 and the second rotatable portion 402a2 with respect to a rotational direction thereof. The driving shaft 402a3, the first rotatable portion 402a1 and the second rotatable portion 402a2 are integrally rotated about the rotational axis C2.

The first rotatable portion 402a1 and the second rotatable portion 402a2 have the same diameter and are formed in the substantially same cylindrical shape with the same length along the main scan direction, and the second rotatable portion 402a2 is disposed on one end side (an X1 direction side shown in FIG. 10) with respect to the main scan direction relative to the first rotatable portion 402a1. On the other hand, the follower roller 402b of the upstream conveying roller pair 402 includes a follower shaft 402b2 extending in the main scan direction and a rotatable portion 402b1 supported rotatably by this follower shaft 402b2. The rotatable portion 402b1 is integrally formed in a cylindrical shape with the same diameter from one end to the other end in the nip portion (upstream nip portion N2) with respect to the main scan direction. In other words, the rotatable portion 402b1 is continuously extended in the rotational axis C1 direction over between the first upstream nip region N2a and the second upstream nip region N2b, and the follower roller 402b is a so-called conveying roller.

Between the first rotatable portion 402a1 and the follower roller 402b, the first upstream nip region N2a for nipping the sheet is formed, and between the second rotatable portion 402a2 and the follower roller 402b, the second upstream nip region N2b for nipping the sheet is formed. In other words, the upstream nip portion N2 formed between the driving roller 402a and the follower roller 402b includes the first upstream nip region N2a as a first nip region for nipping the sheet and the second upstream nip region N2b as a second nip region for nipping the sheet.

The second rotatable portion 402a2 is disposed with an interval (gap) from the first rotatable portion 402a1 with respect to the main scan direction. By this, between the first rotatable portion 402a1 and the second rotatable portion 402a2, a recessed portion 402a4 smaller in dimension (radius) with respect to a radial direction about the rotational axis C2 than each of the first rotatable portion 402a1 and the second rotatable portion 402a2 is formed. In other words, the upstream nip portion N2 includes a recessed portion region N2c where the driving roller 402a is recessed from an outer surface (cylindrical surface) thereof toward the rotational axis C2 and where the sheet is not nipped. Further, the first rotatable portion 402a1 and the second rotatable portion 402a2 are the substantially same in length along the main scan direction, and therefore, the recessed portion 402a4 (recessed portion region N2c) is formed at a central portion 402a5 of the driving roller 402a with respect to the main scan direction.

The above-described sheet detecting sensor S700 is disposed so as to partially enter the recessed portion 402a4 of such a driving roller 402a. In other words, as viewed in the main scan direction, a part of the sheet detecting sensor S700 is disposed so as to overlap with the recessed portion 402a4 of the driving roller 402a with respect to the direction of the rotational axis C2 (FIG. 4). Further, in other words, as viewed in the main scan direction, the part of the sheet detecting sensor S700 is disposed so as to overlap with the first rotatable portion 402a1 and the second rotatable portion 402a2 between the first rotatable portion 402a1 and the second rotatable portion 402a2 with respect to the direction of the rotation axis C2.

By this, in the adjusting unit 400 of this embodiment, the sheet detecting sensor S700 is capable of being disposed at a position closer to the rotational axis C2 than in the case where the driving roller of the upstream conveying roller pair is a (single) conveying roller. Further, by this, the distance L2, with respect to the conveying direction Y2, between the upstream nip portion N2 of the upstream conveying roller pair 402 and the intermediary nip portion N3 of the intermediary conveying roller pair 403 can be shortened, so that it becomes possible to convey various-size sheets including smaller-size sheets.

Incidentally, the driving roller 402a of the upstream conveying roller pair 402 in this embodiment includes the driving shaft 402a3, the first rotatable portion 402a1 and the second rotatable portion 402a2, and the recessed portion 402a4 is formed between the first rotatable portion 402a1 and the second rotatable portion 402a2, but the present invention is not limited thereto. The upstream conveying roller pair 402 may only be required that at least one of the driving roller 402a and the follower roller 402b is provided with a recessed portion. For example, the driving roller 402a includes a driving shaft and a single rotatable portion supported by the driving shaft, and may also include a recessed portion smaller in dimension with respect to a radial direction than another portion is, at a part (for example, a central portion) of the rotatable portion with respect to the main scan direction.

Further, the follower roller 402b is provided with a recessed portion and the sheet detecting sensor S700 may also be disposed so as to enter the recessed portion of the follower roller 402b, and the follower roller 402b may also be disposed on the driving roller 402a. Further, both of the driving roller 402a and the follower roller 402b may also be provided with a recessed portion. Further, as viewed in the rotational axis direction, the sheet detecting sensor S700 may only be required that at least a part thereof overlaps with the recessed portion formed on the driving roller 402a and/or the follower roller 402b. In other words, the sheet detecting sensor S700 may only be required to be provided so that at least a part thereof enters the recessed portion. For example, a part of the sheet detecting sensor S700 and a part of the recessed portion may overlap with each other, and the part of the recessed portion and entirety of the sheet detecting sensor S700 may also overlap with each other.

Incidentally, as in the driving roller 402a in this embodiment, in the nip portion of the roller pair including the roller provided with the recessed portion, a recessed portion region where the sheet is not nipped is formed at a position corresponding to the recessed portion. As shown in part (a) of FIG. 12, the sheet conveyed by such a roller pair partially enters the recessed portion (at a central portion thereof with respect to the widthwise direction in this embodiment) and causes a crease or flexure (waving) with respect to the widthwise direction in some instances. Particularly, in the case where a sheet such as thin paper low in rigidity is conveyed, the sheet is liable to cause the crease or flexure. Further, in the case where reading of the sheet conveyed in a state in which the flexure is caused is performed, it is difficult to obtain sufficient reading accuracy.

For this reason, in the adjusting unit 400 of this embodiment, the inlet conveying roller pair 401 is constituted suitably, so that suppression of the crease or the flexure of the sheet at the recessed portion 402a4 of the upstream conveying roller pair 402 is realized. In the following, with reference to FIGS. 10 and 12, a specific constitution of the inlet conveying roller pair 401 will be described.

As shown in FIGS. 10 and 11 and part (b) of FIG. 12, the driving roller 401a of the inlet conveying roller pair 401 in this embodiment includes a plurality of rotatable portions forming a part of the inlet nip portion N1 between each of the rotatable portions forming a part of the inlet nip portion N1 between each of the rotatable portions and the follower roller 401b. Specifically, the driving roller 401a includes a driving shaft 401a4 rotationally driven by the conveying motor 452, and a first inlet rotatable portion 401a1, a second inlet rotatable portion 401a2 and a third inlet rotatable portion 401a3 which are supported by the driving shaft 401a4. The driving shaft 401a4 is formed along the main scan direction and positions the first to third inlet rotatable portions 401a1 to 401a3 with respect to the rotational direction of the driving shaft 401a4. The driving shaft 401a4 and the first to third inlet rotatable portions 401a1 to 401a3 are integrally rotated about the rotational axis C1.

The first to third rotatable portions 401a1 to 401a3 are formed in the substantially same cylindrical shape with the same diameter and the same length along the main scan direction, and are disposed with intervals (gap) therebetween with respect to the main scan direction. Specifically, the second inlet rotatable portion 401a2 is disposed on one side (X1 direction side) with respect to the main scan direction than the first inlet rotatable portion 401a1, is and the third inlet rotatable portion 401a3 is disposed on one side (X1 direction side) with respect to the main scan direction than the second inlet rotatable portion 402a2 is. Incidentally, lengths of the first to third inlet rotatable portions along the main scan direction may also be different from each other.

Further, the follower roller 401b includes a plurality of rotatable portions disposed with intervals therebetween with respect to the main scan direction. Specifically, the follower roller 401b includes a follower shaft 401c, and a first follower rotatable portion 401b1, a second follower rotatable portion 401b2 and a third follower rotatable portion 401b3 which are rotatably supported by the follower shaft 401c.

Between the first inlet rotatable portion 401a1 and the first follower rotatable portion 401b1, a first inlet nip region N1a for nipping the sheet is formed. Between the second inlet rotatable portion 401a2 and the first follower rotatable portion 4012, a second inlet nip region N1b for nipping the sheet is formed. Between the third inlet rotatable portion 401a3 and the third follower rotatable portion 401b3, a third inlet nip region N1c for nipping the sheet is formed. In other words, the inlet nip portion N1 formed between the driving roller 401a and the follower roller 401b includes the first inlet nip region N1a, the second inlet nip region N1b and the third inlet nip region N1c, in which the sheet is nipped.

As shown in part (b) of FIG. 12, the second inlet nip region N1b disposed between the first inlet nip region N1a and the third inlet nip region N1c is provided at a position where as viewed in the conveying direction Y2, a part of the second inlet nip region N1b overlaps with the central portion 401d of the upstream conveying roller pair 402 with respect to the main scan direction. In other words, as viewed in the conveying direction Y2, the second inlet rotatable portion 401a2 is disposed so that a part thereof overlaps with the recessed portion 402a4 of the upstream conveying roller pair 402 with respect to the direction of the rotational axis C1. Further, in other words, as viewed in a direction perpendicular to the main scan direction, the inlet conveying roller pair 401 forms the inlet nip portion N1 so as to nip the sheet in a region 401a5 where the inlet conveying roller pair 401 overlaps with the recessed portion region N2c of the upstream nip portion N2 with respect to the direction of the rotational axis C1. The inlet conveying roller pair 401 delivers the sheet to the upstream nip portion N2 in a state in which the flexure of the sheet in the overlapping region 401a5 with the recessed portion region N2c is suppressed by nipping and conveying the sheet in the inlet nip portion N1.

By this, the adjusting unit 400 of this embodiment suppresses the crease and flexure of the conveyed sheet even in the case where the upstream conveying roller pair 402 is provided with the recessed portion 402a4, so that reading accuracy of the sheet by the front and back registering portion 700 can be improved. Incidentally, as viewed in the direction perpendicular to the main scan direction, the inlet conveying roller pair 401 may also form the inlet nip portion N1 so as to nip the sheet in the overlapping region with a part of the recessed portion region N2c with respect to the direction of the rotational axis C1.

Further, a distance L5 between one end N1a1 and the other end N1c2 of the inlet nip portion N1 with respect to the main scan direction is larger than a length L6 of the recessed portion 402a4 (recessed portion region N2c) with respect to the main scan direction. That is, the distance between the one end N1a1 of the first inlet nip region N1a with respect to the main scan direction and the other end N1c2 of the third inlet nip region N1c with respect to the main scan direction is larger than the distance between the other end N2a2 of the first upstream nip region N2a and one end N2b1 of the second upstream nip region N2b. By this, the inlet conveying roller pair 401 nips the sheet in a region broader than the recessed portion region N2c where the upstream conveying roller pair 402 does not nip the sheet, so that the flexure of the sheet in the recessed portion 402a4 can be effectively suppressed and thus the sheet reading accuracy can be improved.

Further, the distance L5 between the one end N1a1 and the other end N1c2 of the inlet nip portion N1 with respect to the main scan direction is smaller than a maximum sheet width. Accordingly, the distance L5 is smaller than the distance L4 between the one end N2a1 and the other end N2b2 of the upstream nip portion N2 with respect to the main scan direction. By this, compared with the case where the lengths of the driving roller and the follower roller of the inlet conveying roller pair with respect to the main scan direction are larger than the maximum sheet width, constituent component parts of the driving roller 401a and the follower roller 401b can be downsized, so that a cost can be reduced.

Further, as described above, the follower roller 402b of the upstream conveying roller pair 402 is disposed under the driving roller 402a and is a conveying roller. By this, the upstream conveying roller pair 402 supports a central portion of the conveyed sheet with respect to the widthwise direction, so that downward flexure of the sheet in the recessed portion region N2c by gravitation can be prevented and thus the sheet reading accuracy can be improved. Incidentally, in the upstream conveying roller pair 402 in this embodiment, the follower roller 402 disposed under the driving roller 402a is the conveying roller, but is not limited thereto. Of the pair of rollers constituting the upstream conveying roller pair 402, the roller disposed at a lower portion may only be required to be capable of supporting the sheet in at least a part of the recessed portion region formed by the recessed portion of the roller disposed at an upper portion. For example, the follower roller 402b includes a plurality of rotatable portions disposed with intervals therebetween with respect to the main scan direction, and one of these rotatable portions may also be capable of supporting the sheet in the recessed portion region.

As described above, according to this embodiment, as viewed in the direction perpendicular to the main scan direction, the inlet conveying roller pair 401 forms the inlet nip portion N1 so as to nip the sheet in the overlapping region 401a5 with the recessed portion region N2c of the upstream nip portion N2 with respect to the direction of the rotational axis C1. The inlet conveying roller pair 401 delivers the sheet to the upstream nip portion N2 of the upstream conveying roller pair 402 in the state in which the sheet is nipped and conveyed in the inlet nip portion N1. By this, the crease and the flexure of the conveyed sheet in the recessed portion 402a4 is suppressed, so that the reading accuracy when the contour of the sheet and the image formed on the sheet are read can be improved. Further, by improving the image reading accuracy, an image quality when the image is formed on the sheet in the image forming apparatus can be improved.

Further, the reading accuracy can be improved even when the driving roller 402a is provided with the recessed portion 402a4, so that as viewed in the main scan direction, the sheet detecting sensor S700 is disposed so as to overlap with the recessed portion 402a4 with respect to the direction of the rotational axis C1, and thus it becomes possible to realize downsizing of the image reading apparatus. Further, by this, a large-size light source providing a larger light quantity is mountable in the image reading apparatus, so that an image reading speed can be improved. Further, the downsizing is enabled, so that the through passage 430 along which the image reading is carried out is easily formed linearly. By linearly forming the through passage 430, even in the case where the sheet is discharged to the finisher after the reading of the sheet as the product, warpage of the sheet does not readily occur, so that a quality of the product can be improved. Further, by linearly forming the through passage 430, a time necessary to perform the reading and conveying of the sheet is shortened, so that operation efficiency can be improved. Further, the downsizing of the image reading apparatus is enabled, so that it becomes possible to convey various-size sheets including smaller-size sheets.

Incidentally, the linearly formed sheet conveying passage (path) is not limited to a sheet conveying passage (path) formed along a complete rectilinear line. The sheet conveying passage which is formed from a receiving opening toward the discharging opening and along which the reading means is disposed may only be required to be formed along approximately rectilinear line. For example, the sheet conveying passage may also be formed so that as viewed in the rotational axis direction, a distance from a predetermined phantom rectilinear line falls within a range of not more than a diameter (preferably be a radius) of any one of the rotatable members (rollers). Further, for example, the sheet conveying passage may also be formed so that as viewed in the rotational axis direction, a change in direction in which the sheet is conveyed from the receiving opening to the discharging opening falls within 30° at the maximum. Thus, by curving the sheet conveying passage slightly to the extent that the sheet does not cause the warpage, it becomes possible to suppress a change in distance between the reading means, and the conveyed sheet at the reading position.

Further, in this embodiment, as the image reading apparatus, the adjusting unit 400 for reading the test patterns 820 for performing the front and back registration and reading the contour of the sheet was described, but the present invention is not limited thereto. The image reading apparatus may only be required to be provided with the reading means for reading the image information of the sheet nipped and conveyed, and does not have to read the contour of the sheet and does not have to perform the front and back registration. For example, the image reading apparatus may also be provided with a color sensor as a reading means for reading color information (density information) of a test pattern (image) formed on the sheet in order to perform color (tint) adjustment, density adjustment and the like adjustment.

Further, the image reading apparatus may also be an image reading apparatus provided for the purpose of converting contents into electronic data after reading a general image, an original or the like.

Further, in this embodiment, all the inlet conveying roller pair 401, the upstream conveying roller pair 402, the intermediary conveying roller pair 403, the downstream conveying roller pair 404 and the outlet conveying roller pair 405 are driven by the conveying motor 452, but the present invention is not limited thereto. The image reading apparatus may also be provided with a plurality of conveying motors, as driving means for the above-described roller pairs, capable of independently driving these roller pairs, respectively.

Second Embodiment

A second embodiment is different from the first embodiment in constitution of the inlet conveying roller pair, and the same constitution as the constitution of the first embodiment will be omitted from description. In the first embodiment, the driving roller 401a of the inlet conveying roller pair 401 includes the three rotatable portions which are disposed with the intervals therebetween with respect to the main scan direction and which form the inlet nip is portion N1 between themselves and the follower roller 401b, but is not limited thereto. As viewed in the direction perpendicular to the rotational axis, the inlet conveying roller pair may only be required to form the nip portion so as to nip the sheet in the overlapping region with the recessed portion region N2c of the upstream nip portion N2 of the upstream conveying roller pair 402 with respect to the direction of the rotational axis C1. For example, as in the case of an inlet conveying roller pair 406 as a first roller pair in the second embodiment shown in FIG. 13, a driving roller 406a may include seven rotatable portions 406a1 to 406a7 and may also include rotatable portions in other numbers.

Further, a follower roller for forming a nip portion in cooperation with the driving roller 406a may include rotatable portions in the same number as the number (seven) of the rotatable portions of the driving roller 406a, but may also include rotatable portions in different numbers or may also be a single conveying roller. Incidentally, in order to present a biased conveying force exerted on the sheet with respect to the main scan direction, it is desirable that the numbers of the rotatable portions of the driving roller and the follower roller of the inlet conveying roller pair are odd numbers. Further, the inlet conveying roller pair may also be formed so that a length of the nip portion, with respect to the main scan direction, formed between the driving roller and the follower roller is larger than the maximum sheet width. In the case where the inlet conveying roller pair is formed in this way, the inlet conveying roller pair is capable of imparting a uniform conveying force with respect to the main scan direction irrespective of a size of the conveyed sheet, so that straightness of the conveyed sheet can be improved.

Third Embodiment

A third embodiment is different from the first embodiment in constitution of the inlet conveying roller pair, and the same constitution as the constitution of the first embodiment will be omitted from description. In the first embodiment, the driving roller 401a of the inlet conveying roller pair 401 includes the three rotatable portions, and the length of the inlet nip portion N1 with respect to the main scan direction is smaller than the maximum sheet width, but is not limited thereto. For example, as in the case of an inlet conveying roller pair 407 as a first roller pair in the third embodiment shown in FIG. 14, each of a rotatable portion 407a1 of a driving roller 407a and a follower roller may be a single conveying roller. That is, the driving roller 407a of the inlet conveying roller pair 407 is integrally formed in a cylindrical shape with the same diameter over from one end to the other end of the inlet nip portion N1 with respect to the rotational axis direction and may include the rotatable portion 407a1 for forming the nip portion between itself and the follower roller. Further, the follower roller of the inlet conveying roller pair 407 may be a single conveying roller or may include a plurality of rotatable portions.

Fourth Embodiment

A fourth embodiment is different from the first embodiment in constitution of the inlet conveying roller pair, and the same constitution as the constitution of the first embodiment will be omitted from description. In the first embodiment, the driving roller 401a of the inlet conveying roller pair 401 includes the three rotatable portions which are disposed with the intervals therebetween with respect to the main scan direction and which form the inlet nip portion N1 between themselves and the follower roller 401b, but is not limited thereto. For example, as in the case of an inlet conveying roller pair 408 as a first roller pair in the fourth embodiment shown in FIG. 15, each of a driving roller 408a as a rotatable member and a follower roller may be constituted by single rotatable portion for forming an inlet nip portion shorter than the maximum sheet width. That is, the driving roller 408a may include a rotatable portion 408a1 integrally formed in a cylindrical shape with the same diameter over from one end to the other end of the inlet nip portion shorter than the maximum sheet width with respect to the main scan direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-069413 filed on Apr. 7, 2020, which is hereby incorporated by reference herein in its entirety.

What is claimed is:

1. An image reading apparatus for reading image information on a sheet discharged from an image forming apparatus for forming an image on the sheet, said image reading apparatus comprising:
   a first roller pair configured to form a first nip portion in which the sheet is nipped and to convey the sheet at the first nip portion;
   a second roller pair, provided downstream of said first roller pair in a sheet conveying direction, configured to form second nip portions in which the sheet is nipped and convey the sheet at the second nip portions;
   a reading unit configured to read the image information on the sheet conveyed by said first roller pair and said second roller pair; and
   a detecting unit configured to detect the sheet to be conveyed toward said reading unit;
   wherein said second roller pair includes a recessed portion formed between said second nip portions with respect to a rotational axis direction,
   wherein said detecting unit is provided so that at least a part thereof enters said recessed portion, and
   wherein said first roller pair is configured to form the first nip portion so as to nip the sheet in a region overlapping with said recessed portion with respect to the rotational axis direction and to deliver the sheet, nipped in the first nip portion, to the second nip portions.

2. An image reading apparatus according to claim 1, wherein a distance between the first nip portion and the second nip portions with respect to the sheet conveying direction is smaller than a length of a minimum-size sheet capable of being conveyed by said image reading apparatus.

3. An image forming apparatus according to claim 1, wherein a distance between one end and the other end of the second nip portions with respect to the rotational axis direction is larger than a length of a maximum-size sheet capable of being conveyed by said image reading apparatus.

4. An image forming apparatus according to claim 1, wherein a distance between one end and the other end of the first nip portion with respect to the rotational axis direction is larger than a length of a maximum-size sheet capable of being conveyed by said image reading apparatus.

5. An image reading apparatus according to claim 1, wherein said recessed portion is formed at a central portion of the second nip portions with respect to the rotational axis direction.

6. An image reading apparatus according to claim 1, wherein said second roller pair includes a first roller and second rollers forming the second nip portions in cooperation with said first roller,
   wherein said second rollers are provided on said first roller, and
   wherein said first roller is continuously extended over between the second nip portions.

7. An image reading apparatus according to claim 1, further comprising:
   a receiving opening configured to receive the sheet conveyed by said first roller pair;
   a discharging opening configured to permit discharge of the sheet conveyed by said second roller pair; and
   a sheet conveying passage formed linearly along the sheet conveying direction from said receiving opening toward said discharging opening and configured to convey the sheet by said first roller pair and said second roller pair,
   wherein said first roller pair, said second roller pair and said reading unit are provided in said sheet conveying passage.

8. An image reading apparatus according to claim 7, wherein said reading unit comprises:
   a first reading unit configured to read image information on a first surface of the sheet conveyed by said second roller pair; and
   a second reading unit configured to read image information on a second surface, opposite from the first surface, of the sheet conveyed by said second roller pair.

9. An image reading apparatus according to claim 8, wherein said discharging opening is a first discharging opening, wherein said sheet conveying passage is a first sheet conveying passage, and wherein said image reading apparatus further comprises:
a second discharging opening configured to discharge of the sheet conveyed by said second roller pair;
a second sheet conveying passage branching from said first sheet conveying passage toward said second discharging opening; and
a sheet stacking portion configured to stack the sheet discharged through said second discharging opening,
wherein said second sheet conveying passage is formed so as to branch from said first sheet conveying passage on a side downstream of said first reading unit and said second reading unit.

10. An image reading apparatus according to claim 9, wherein said first roller pair is provided so as to face said receiving opening,
wherein said second roller pair is provided adjacent to said first roller pair, and
wherein said reading unit is provided adjacent to said second roller pair.

11. An image reading apparatus according to claim 1, wherein a distance between one end and the other end of the first nip portion with respect to the rotational axis direction is smaller than a distance between one end and the other end of the second nip portions with respect to the rotational axis direction.

12. An image reading apparatus according to claim 1, wherein a distance between one end and the other end of the first nip portion with respect to the rotational axis direction is larger than a length, with respect to the rotational axis direction, of a maximum-size sheet capable of being conveyed by said image reading apparatus.

13. An image reading apparatus according to claim 1, wherein said first roller pair includes one roller and the other roller forming the first nip portion in cooperation with said one roller, and
wherein said one roller includes a plurality of rotatable portions provided with an interval therebetween.

14. An image reading apparatus according to claim 1, wherein said first roller pair includes one roller continuously extending over from one end to the other end of the first nip portion with respect to the rotational axis direction.

15. An image forming system comprising:
an image forming apparatus including an image forming portion for forming an image on a sheet; and
an image reading apparatus according to claim 1 configured to read image information of the sheet discharged from said image forming apparatus.

16. An image forming system according to claim 15, wherein on the basis of the image information read by said image reading apparatus, said image forming apparatus corrects a position of the image relative to the sheet when the image is formed on the sheet.

* * * * *